US011743966B2

(12) United States Patent
Lee et al.

(10) Patent No.: US 11,743,966 B2
(45) Date of Patent: Aug. 29, 2023

(54) CONNECTED MODE DISCONTINUOUS RECEPTION (CDRX) IN CARRIER AGGREGATION MODE WITH MIXED NUMEROLOGIES

(71) Applicant: QUALCOMM Incorporated, San Diego, CA (US)

(72) Inventors: Heechoon Lee, San Diego, CA (US); Arvind Vardarajan Santhanam, San Diego, CA (US); Alexei Yurievitch Gorokhov, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/940,177

(22) Filed: Jul. 27, 2020

(65) Prior Publication Data

US 2021/0037592 A1  Feb. 4, 2021

Related U.S. Application Data

(60) Provisional application No. 62/879,954, filed on Jul. 29, 2019.

(51) Int. Cl.
*H04W 76/28* (2018.01)
*H04W 76/27* (2018.01)
(Continued)

(52) U.S. Cl.
CPC ............ *H04W 76/28* (2018.02); *H04B 1/005* (2013.01); *H04L 1/1812* (2013.01);
(Continued)

(58) Field of Classification Search
CPC . H04W 76/28; H04W 76/27; H04W 72/0453; H04W 72/1284; H04W 72/14;
(Continued)

(56) References Cited

U.S. PATENT DOCUMENTS

2016/0066242 A1* 3/2016 Su ...................... H04W 36/0085
  455/436
2019/0215048 A1* 7/2019 Cirik ...................... H04B 7/088
(Continued)

OTHER PUBLICATIONS

Interdigital Inc: "C-DRX for Multiple Numerologies", 3GPP Draft, R2-1704913, 3GPP TSG-RAN WG2 #98, (R15 NR WI AI10319 C-DRX for Multiple Numerologies), 3rd Generation Partnership Project (3GPP), Mobile Competence Centre, 650, Route Des Lucioles, F-06921 Sophia-Antipolis Ced, vol. RAN WG2. No. Hangzhou, May 15, 2017-May 19, 2017, May 14, 2017 (May 14, 2017), XP051275428, pp. 1-4, Retrieved from the Internet:URL:http://www.3gpp.org/ftp/Meetings_3GPP_SYNC/RAN2/Docs/ [retrieved on May 14, 2017] Sec. 1, p. 1 Sec.3, p. 2, Sec.3, p. 3.

(Continued)

*Primary Examiner* — Justin T Van Roie
(74) *Attorney, Agent, or Firm* — Muncy, Geissler, Olds & Lowe, P.C.; Nerrie M. Zohn

(57) ABSTRACT

Disclosed are techniques for enabling a user equipment (UE) operating in carrier aggregation mode to use different connected mode discontinuous reception (CDRX) configurations for different sets of component carriers associated with different sets of numerologies. For example, in Frequency 1 (FR1) plus Frequency 2 (FR2) carrier aggregation (i.e., one or more FR1 component carriers and one or more FR2 component carriers), a different CDRX can be configured for FR1 than for FR2. In inter-band carrier aggregation (i.e., one or more component carriers in one frequency band and one or more component carriers in another frequency band), CDRX can be configured per band. For mixed numerologies carrier aggregation (i.e., one or more component carriers with a first numerology and one or more component carriers with a different numerology), CDRX can be configured per cell group, where each cell group contains a single numerology or mixed numerologies.

54 Claims, 18 Drawing Sheets

(51) Int. Cl.
  *H04B 1/00*      (2006.01)
  *H04L 1/1812*    (2023.01)
  *H04L 5/00*      (2006.01)
  *H04W 72/0453*   (2023.01)
  *H04W 74/08*     (2009.01)
  *H04W 72/21*     (2023.01)
  *H04W 72/23*     (2023.01)

(52) U.S. Cl.
  CPC ....... *H04L 5/0048* (2013.01); *H04W 72/0453* (2013.01); *H04W 72/21* (2023.01); *H04W 72/23* (2023.01); *H04W 74/0833* (2013.01); *H04W 76/27* (2018.02)

(58) Field of Classification Search
  CPC ......... H04W 74/0833; H04W 52/0216; H04W 72/23; H04W 72/21; H04B 1/005; H04L 1/1812; H04L 5/0048; H04L 27/2602; H04L 5/001; H04L 5/0091; Y02D 30/70
  See application file for complete search history.

(56) References Cited

U.S. PATENT DOCUMENTS

| | | | | |
|---|---|---|---|---|
| 2019/0215888 | A1* | 7/2019 | Cirik | H04W 72/0446 |
| 2019/0289513 | A1* | 9/2019 | Jeon | H04L 5/0098 |
| 2019/0313457 | A1* | 10/2019 | Tsai | H04L 5/0007 |
| 2020/0195410 | A1* | 6/2020 | Li | H04L 1/1819 |
| 2020/0245333 | A1* | 7/2020 | Lin | H04L 5/0057 |
| 2021/0014893 | A1* | 1/2021 | Park | H04L 5/0092 |

OTHER PUBLICATIONS

Interdigital Inc: "C-DRX with Multiple Configurations".3GPP Draft, R2-1706683, 3GPP TSG-RAN WG2 NR AH#2, 3rd Generation Partnership Project (3GPP). Mobile Competence Centre, 650, Route Des Lucioles, F-06921 Sophia-Antipolis Cedex, France, vol. RAN WG2, No. Qingdao, P.R, China, Jun. 27, 2017-Jun. 29, 2017, Jun. 16, 2017 (Jun. 16, 2017), XP051306809, pp. 1-5, Retrieved from the Internet:URL:http://www.3gpp.org/ftp/tsg_ran/WG2_RL2/TSGR2_AHs/2017_06_NR/Docs/[retrieved on Jun. 16, 2017] the Whole Document.

International Search Report and Written Opinion—PCT/US2020/043832—ISA/EPO—dated Oct. 27, 2020.

Qualcomm Incorporated: "Configurations of C-DRX in NR", 3GPP Draft, R2-1704899, 3GPP TSG-RAN WG2 Meeting #98, Configuration of C-DRX in NR, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 4, 2017 (May 4, 2017), XP051263639, pp. 1-3, Retrieved from the Internet:URL:http://www.3gpp.org/ftp/tsg_ran/WG2_RL2/TSGR_298/Docs/[retrieved on May 4, 2017] Sec. 1, p. 3.

VIVO: "Clarification on the MAC Timer", 3GPP Draft, R2-1901777, 3GPP TSG-RAN WG2 Meeting #105, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 25, 2019-Mar. 1, 2019, Feb. 15, 2019 (Feb. 15, 2019), XP051603127, 7 Pages, Retrieved from the Internet: URL:http://www.3gpp.org/ftp/tsg%5Fran/WG2%5FRL2/TSGR2%5F105/Docs/R2%2D1901777%2Ezip [retrieved on Feb. 15, 2019] p. 6-p. 7.

* cited by examiner

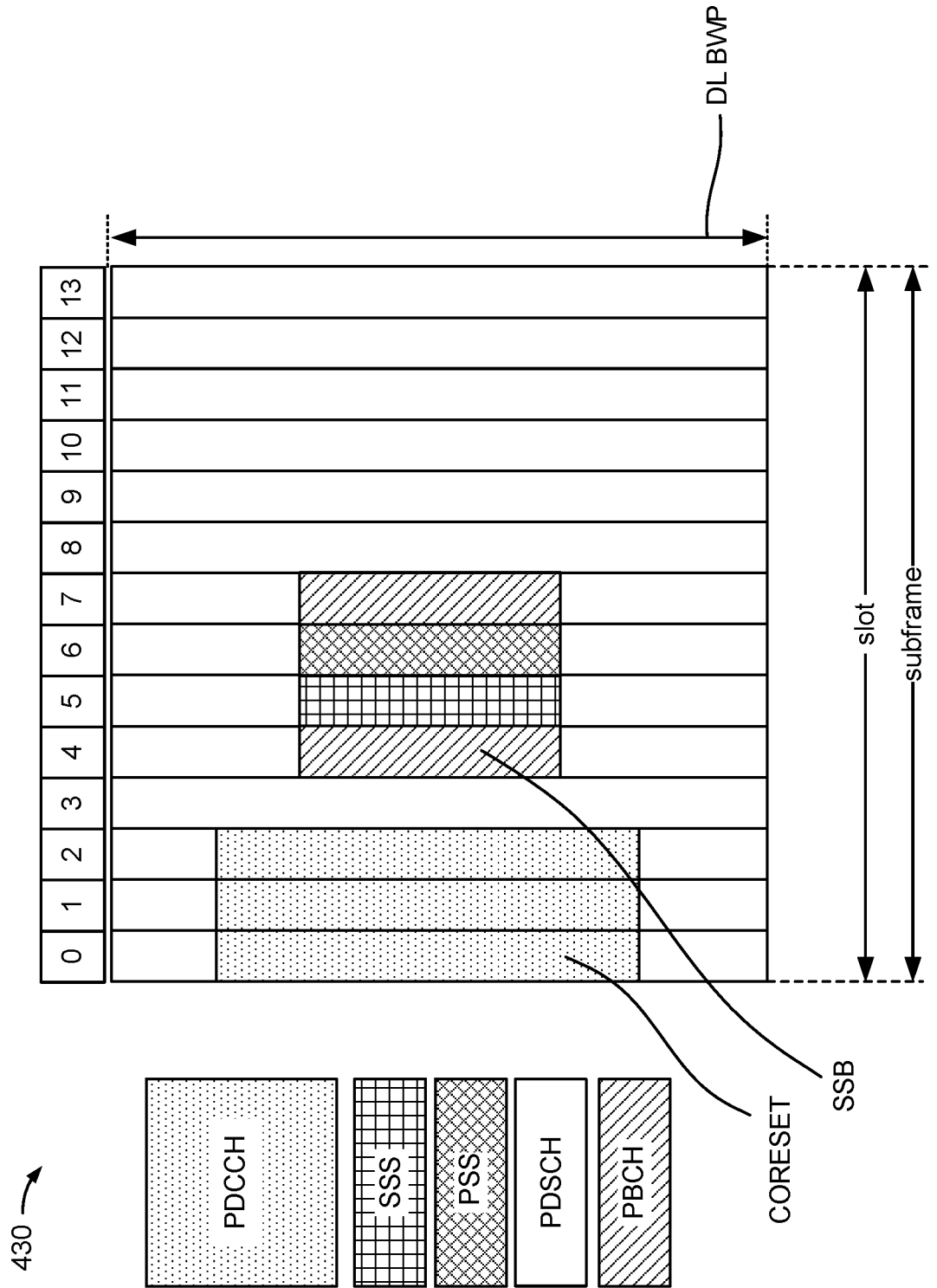

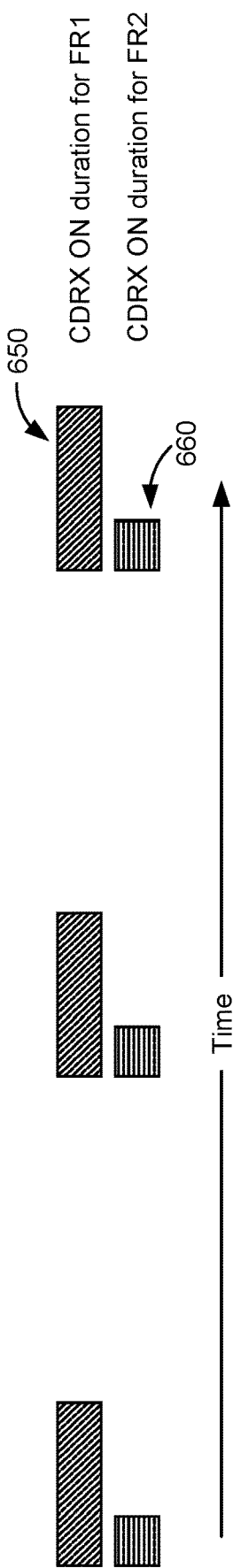

CONNECTED MODE DISCONTINUOUS RECEPTION (CDRX) IN CARRIER AGGREGATION MODE WITH MIXED NUMEROLOGIES

CROSS-REFERENCE TO RELATED APPLICATIONS

The present Application for Patent claims the benefit of U.S. Provisional Application No. 62/879,954, entitled "CONNECTED MODE DISCONTINUOUS RECEPTION (CDRX) IN CARRIER AGGREGATION MODE WITH MIXED NUMEROLOGIES," filed Jul. 29, 2019, assigned to the assignee hereof, and expressly incorporated herein by reference in its entirety.

BACKGROUND OF THE DISCLOSURE

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

The present disclosure provides techniques for enabling a user equipment (UE) operating in carrier aggregation mode to use different connected mode discontinuous reception (CDRX) configurations for different sets of component carriers associated with different sets of numerologies. For example, in Frequency 1 (FR1) plus Frequency 2 (FR2) carrier aggregation (i.e., one or more FR1 component carriers and one or more FR2 component carriers), a different CDRX can be configured for FR1 than for FR2. In inter-band carrier aggregation (i.e., one or more component carriers in one frequency band and one or more component carriers in another frequency band), CDRX can be configured per band. For mixed numerologies carrier aggregation (i.e., one or more component carriers with a first numerology and one or more component carriers with a different numerology), CDRX can be configured per cell group, where each cell group contains a single numerology or mixed numerologies.

In an aspect, a method of wireless communication performed by a UE operating in a carrier aggregation mode includes communicating with a base station in accordance with a first set of CDRX parameters defined in absolute time for a first set of component carriers associated with a first set of numerologies, and communicating with the base station in accordance with a second set of CDRX parameters defined in absolute time for a second set of component carriers associated with a second set of numerologies.

In an aspect, an apparatus for wireless communication includes at least one receiver of a UE configured to operate in a carrier aggregation mode, the at least one receiver configured to: communicate with a base station in accordance with a first set of CDRX parameters defined in absolute time for a first set of component carriers associated with a first set of numerologies, and communicate with the base station in accordance with a second set of CDRX parameters defined in absolute time for a second set of component carriers associated with a second set of numerologies.

In an aspect, a UE configured to operate in a carrier aggregation mode includes means for communicating with a base station in accordance with a first set of CDRX parameters defined in absolute time for a first set of component carriers associated with a first set of numerologies, and means for communicating with the base station in accordance with a second set of CDRX parameters defined in absolute time for a second set of component carriers associated with a second set of numerologies.

In an aspect, a non-transitory computer-readable medium storing computer-executable instructions for wireless communication includes computer-executable instructions comprising at least one instruction instructing a UE operating in a carrier aggregation mode to communicate with a base station in accordance with a first set of CDRX parameters defined in absolute time for a first set of component carriers associated with a first set of numerologies, and at least one instruction instructing the UE to communicate with the base station in accordance with a second set of CDRX parameters defined in absolute time for a second set of component carriers associated with a second set of numerologies.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 4A and 4B are diagrams illustrating example frame structures and channels within the frame structures, according to aspects of the disclosure.

FIGS. 6A and 6B illustrate exemplary DRX configurations, according to aspects of the disclosure.

DETAILED DESCRIPTION

Figure 1:
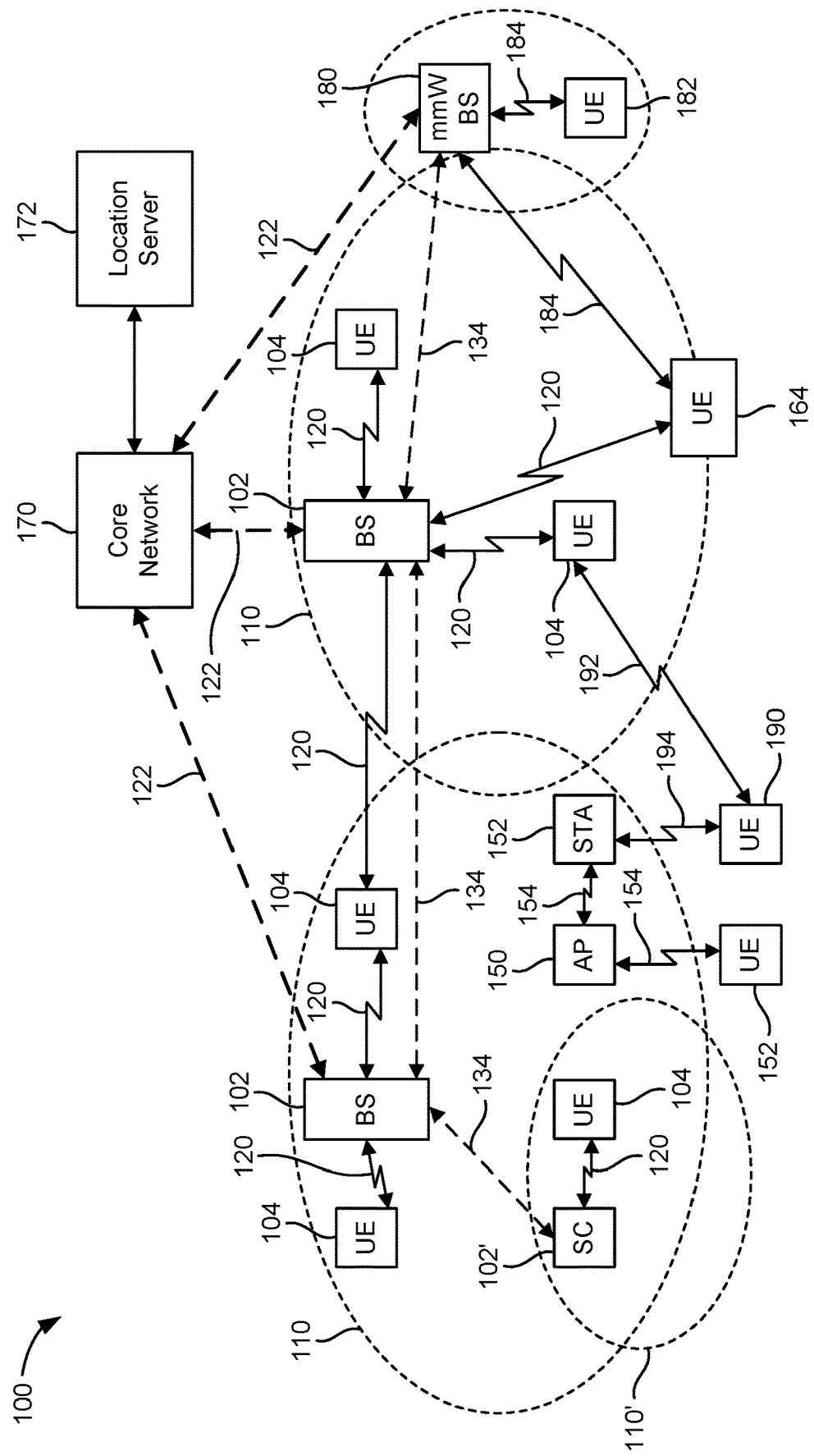
FIG. 1 illustrates an exemplary wireless communications system, according to aspects of the disclosure.

The present disclosure provides techniques for enabling a UE operating in carrier aggregation mode to use different CDRX configurations (referred to herein as "multi-CDRX") for different sets of component carriers associated with different sets of numerologies. For example, in FR1 plus FR2 carrier aggregation (i.e., one or more FR1 component carriers and one or more FR2 component carriers), a different CDRX can be configured for FR1 than for FR2. In inter-band carrier aggregation (i.e., one or more component carriers in one frequency band and one or more component carriers in another frequency band), CDRX can be configured per band. For mixed numerologies carrier aggregation (i.e., one or more component carriers with a first numerology and one or more component carriers with a different numerology), CDRX can be configured per cell group, where each cell group contains a single numerology or mixed numerologies.

These and other aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102/UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102/UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
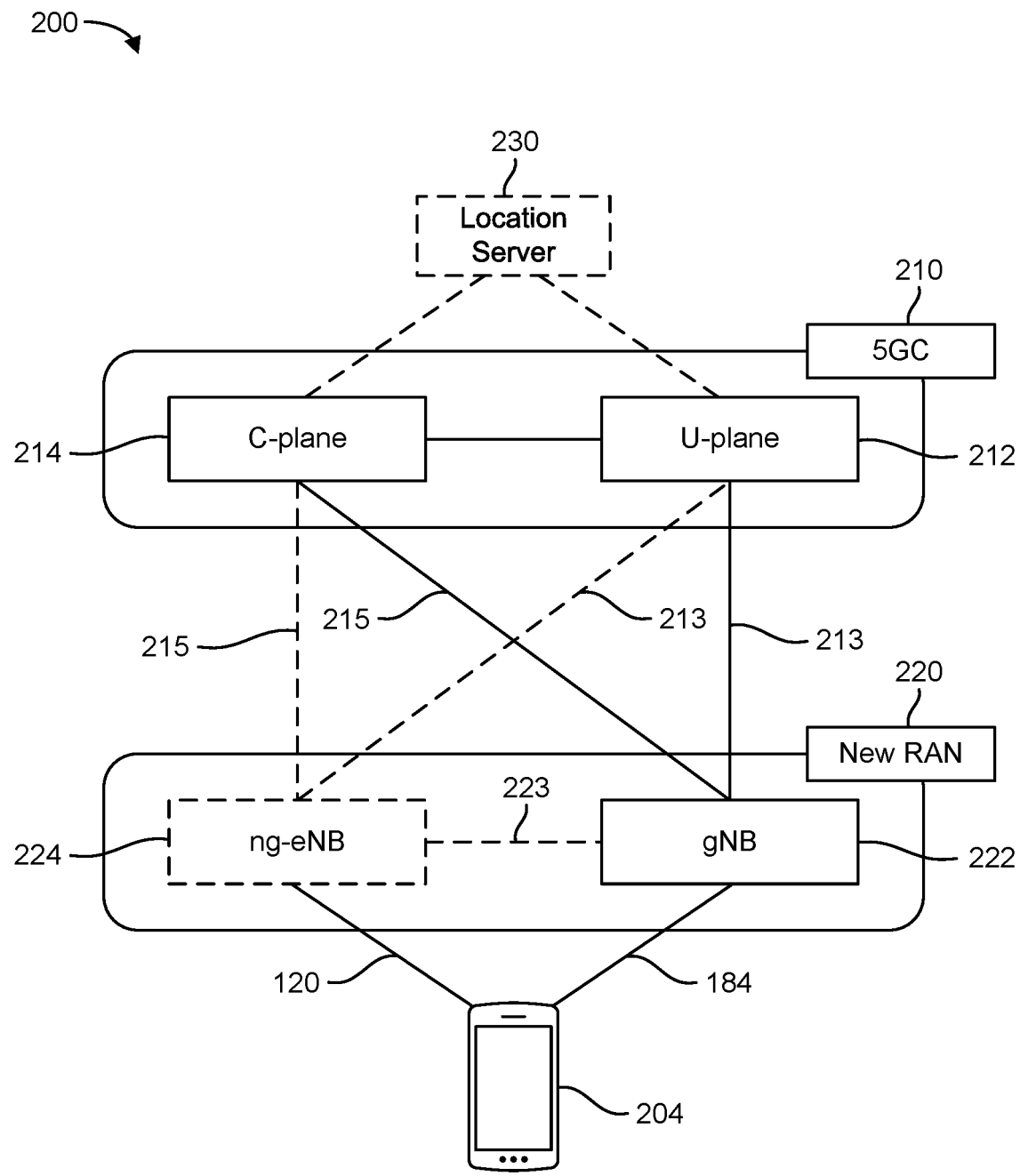
FIGS. 2A and 2B illustrate example wireless network structures, according to aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
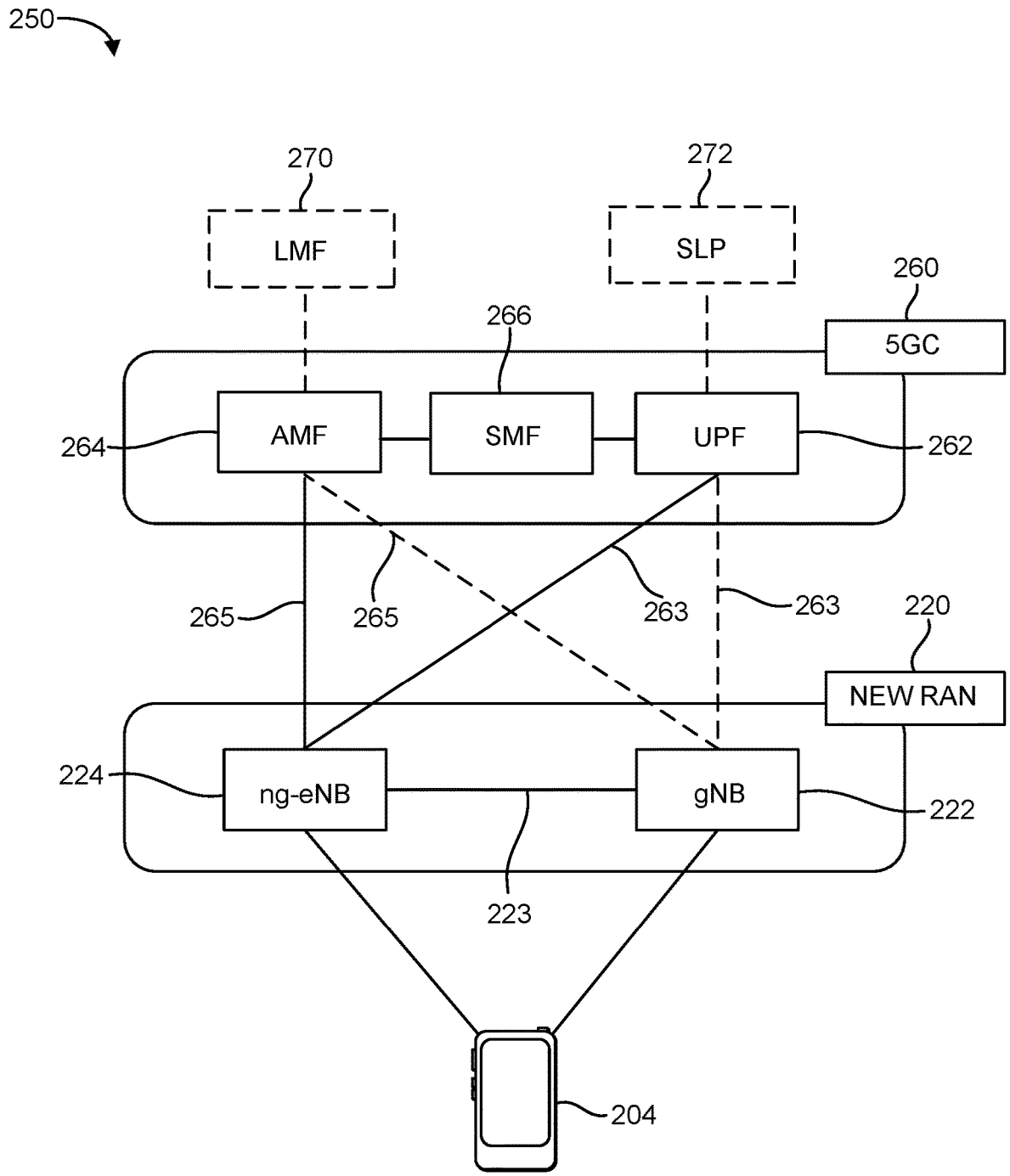

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNGs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
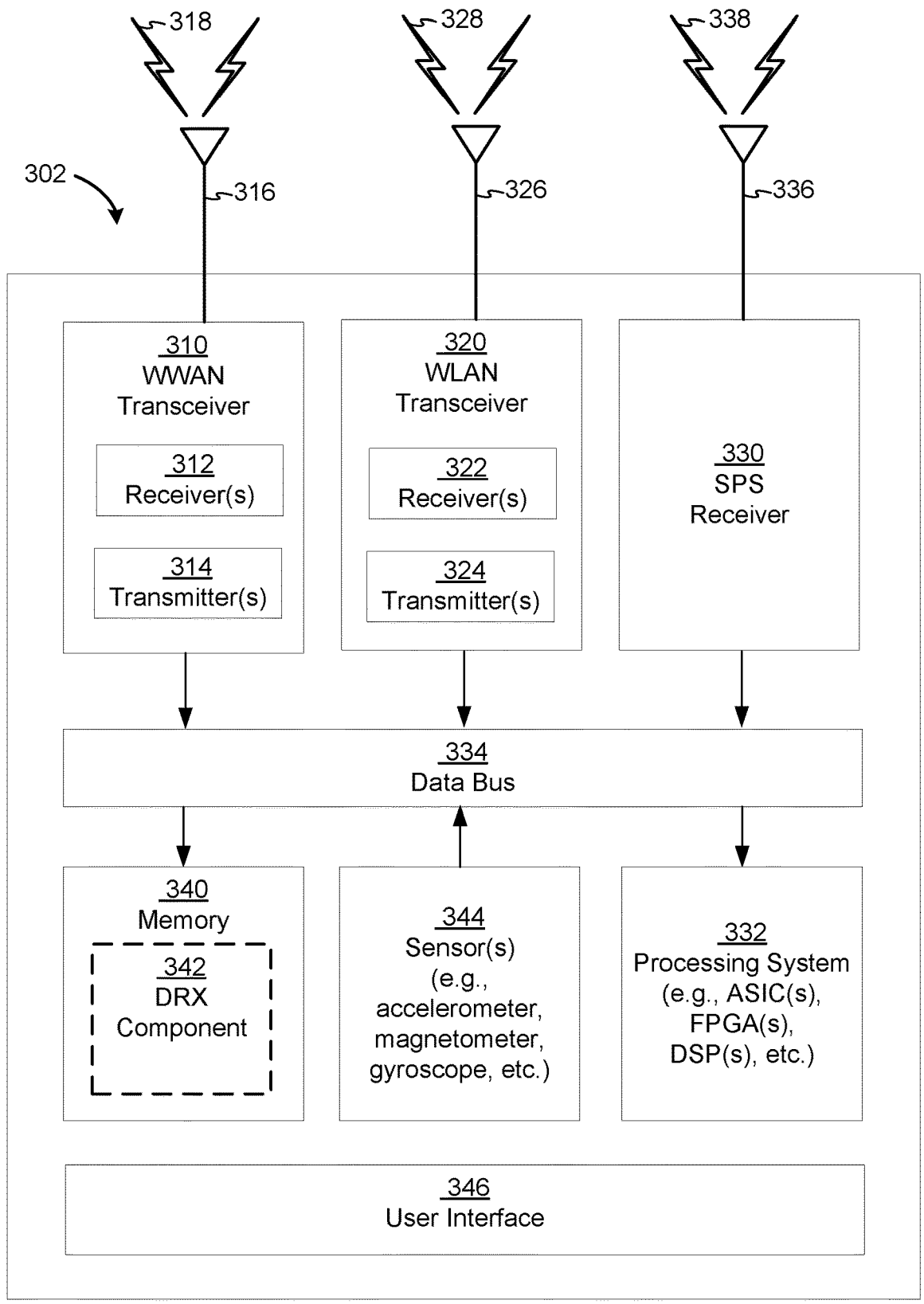
FIGS. 3A to 3C are simplified block diagrams of several sample aspects of components that may be employed in wireless communication nodes and configured to support communication as taught herein.
Figure 3B:
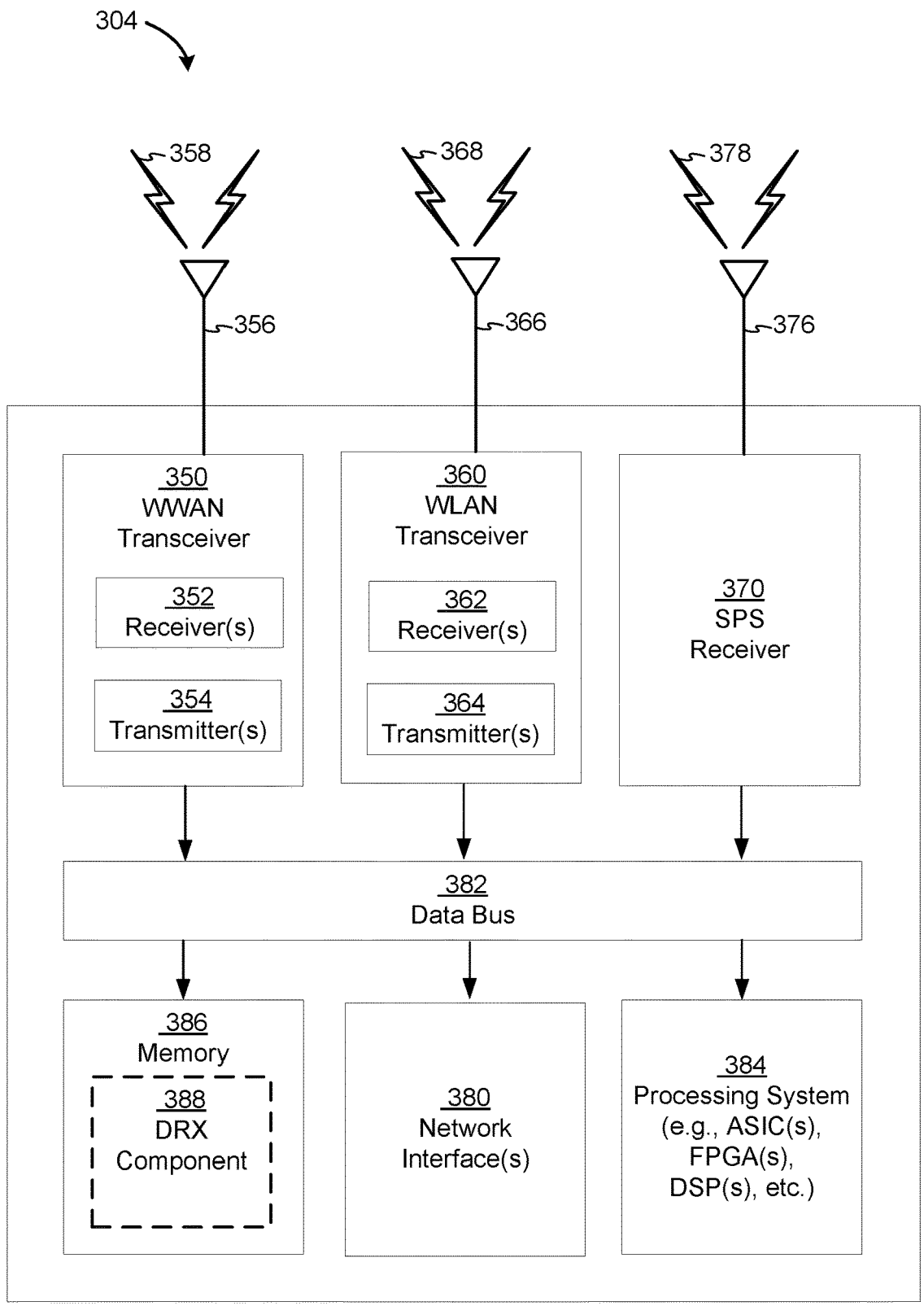
Figure 3C:
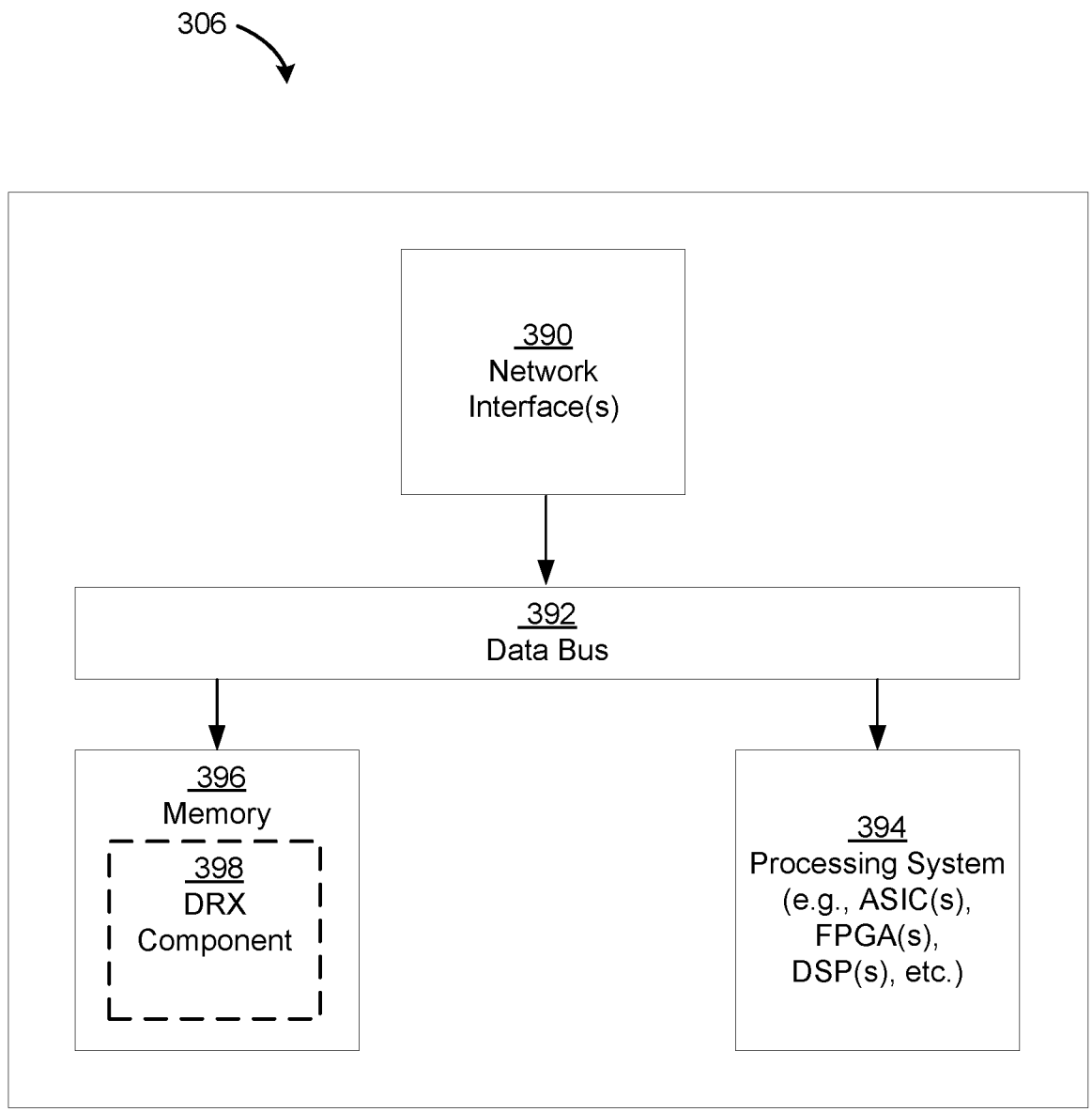

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless communication, and for providing other processing functionality. The base station 304 includes a processing system 384 for providing functionality relating to, for example, wireless communication as disclosed herein, and for providing other processing functionality. The network entity 306 includes a processing system 394 for providing functionality relating to, for example, wireless communication as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include DRX components 342, 388, and 398, respectively. The DRX components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the DRX components 342, 388, and 398 may be external to the processing systems 332, 384, and 394 (e.g., part of a modem processing system, integrated with another processing system, etc.). Alternatively, the DRX components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the DRX components 342, 388, and 398, etc.

Figure 3D:
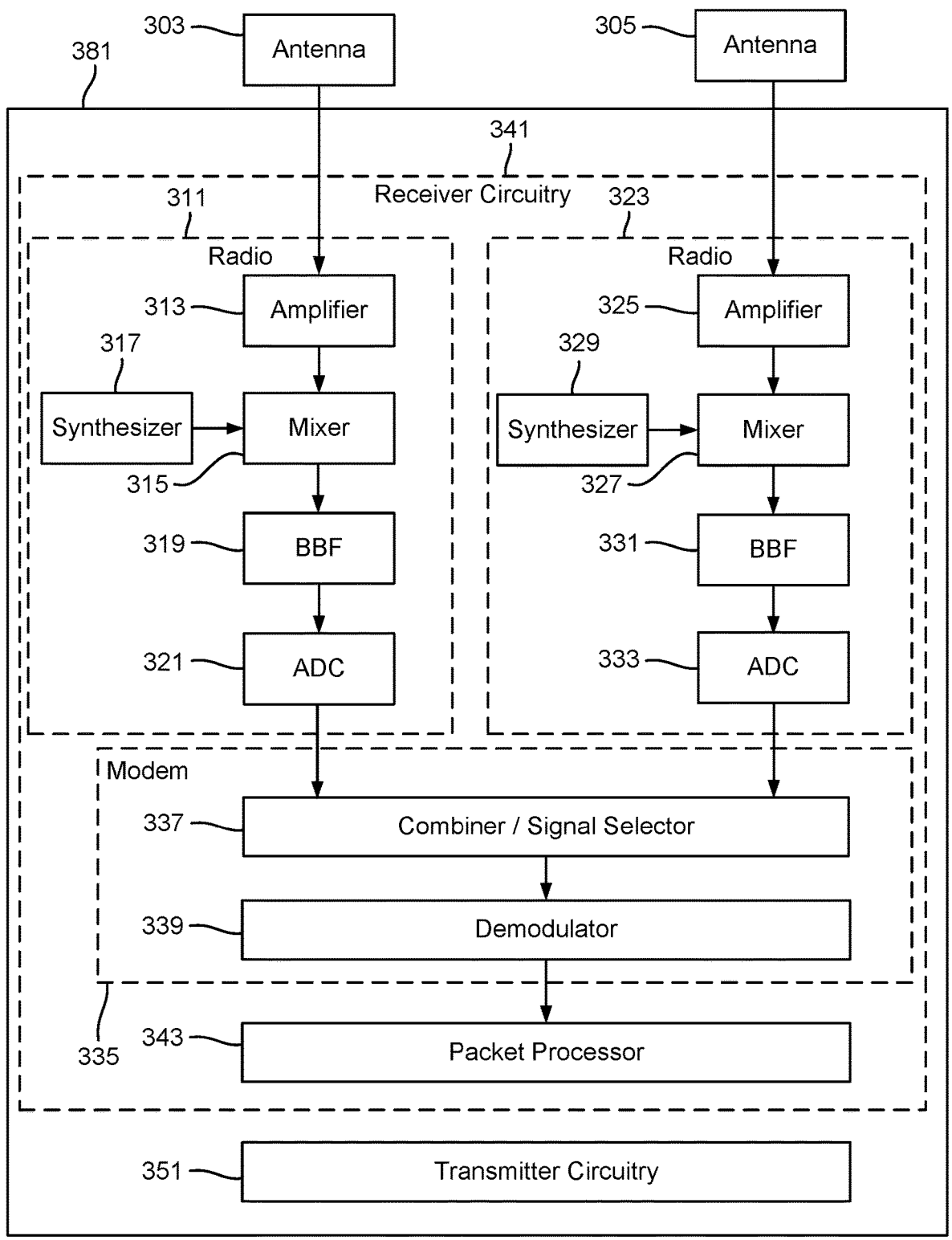
FIG. 3D is a block diagram illustrating an exemplary transceiver, according to aspects of the disclosure.

FIG. 3D illustrates an exemplary architecture of a transceiver 381 capable of implementing carrier aggregation, according to at least one aspect of the disclosure. The transceiver 381 may correspond to WWAN transceiver 310 or WLAN transceiver 320 of UE 302 or WWAN transceiver 350 or WLAN transceiver 360 of base station 304. The transceiver 381 may be coupled to first and second antennas 303 and 305. The antennas may correspond to antennas 316 or 326 of UE 302 or antennas 356 or 366 of base station 304.

The transceiver 381 includes receiver circuitry 341 and transmitter circuitry 351. The receiver circuitry 341 may correspond to receiver(s) 312, 322, 352, or 362 and the transmitter circuitry 351 may correspond to transmitter(s) 314, 324, 354, or 364. The receiver circuitry 341 is capable of implementing carrier aggregation. As such, in the example of FIG. 3D, the receiver circuitry 341 includes two radios 311 and 323 coupled to the two antennas 303 and 305, respectively. Note that although FIG. 3D illustrates only two antennas 303 and 305 and two radios 311 and 323, as will be appreciated, there may be more than two antennas and two radios. The transmitter circuitry 351 may also be capable of implementing carrier aggregation similarly to the receiver circuitry 341, but this is not shown in FIG. 3D for the sake of simplicity.

A transceiver (e.g., transceiver 381) generally includes a modem (e.g., modem 335) and a radio (e.g., radio 311 or 323). The radio, broadly speaking, handles selection and conversion of the RF signals into the baseband or intermediate frequency and converts the RF signals to the digital domain. The modem is the remainder of the transceiver.

Referring to FIG. 3D, radio 311 includes an amplifier 313, a mixer 315 (also referred to as a signal multiplier) for signal down conversion, a frequency synthesizer 317 (also referred to as an oscillator) that provides signals to the mixer 315, a baseband filter (BBF) 319, and an analog-to-digital converter (ADC) 321. Similarly, radio 323 includes an amplifier 325, a mixer 327, a frequency synthesizer 329, a BBF 331, and an ADC 333. The ADCs 321 and 333 are coupled to the signal combiner/signal selector 337 of the modem 335, which is coupled to the demodulator 339 of the modem 335. The demodulator 339 is coupled to a packet processor 343. The demodulator 339 and the packet processor 343 provide demodulated and processed single or multiple output signals to the communication controller and/or processing system (e.g., processing system 332 or 384).

Note that not every component illustrated in FIG. 3 is required for the operation of the system. For example, in direct RF-to-baseband conversion receivers, or any other direct conversion receivers, including certain software-defined radio (SDR) implementations, various components of the receiver circuitry 341 are not necessary, as is known in the art. In addition, while FIG. 3D illustrates a single modem 335 coupled to two radios 311 and 323, as will be appreciated, each radio 311 and 323 may be coupled to a different modem, and the receiver circuitry 341 would therefore include the same number of radios and modems. Further, while FIG. 3D illustrates integrated transmitter circuitry 351 and receiver circuitry 341, i.e., transceiver 381, in some implementations, a UE or base station may comprise a separate transmitter device and a separate receiver device.

As noted above, carrier aggregation is a technique whereby a UE (e.g., any of the UEs described herein) can receive and/or transmit on multiple carrier frequencies at the same time, thereby increasing downlink and uplink data rates. Thus, the UE may simultaneously utilize radio 311 to tune to one carrier frequency (e.g., the anchor carrier) and radio 323 to tune to a different carrier frequency (e.g., a secondary carrier). In addition, each radio 311 and 323 may be tunable to a plurality of different frequencies, one at a time.

Figure 4A:
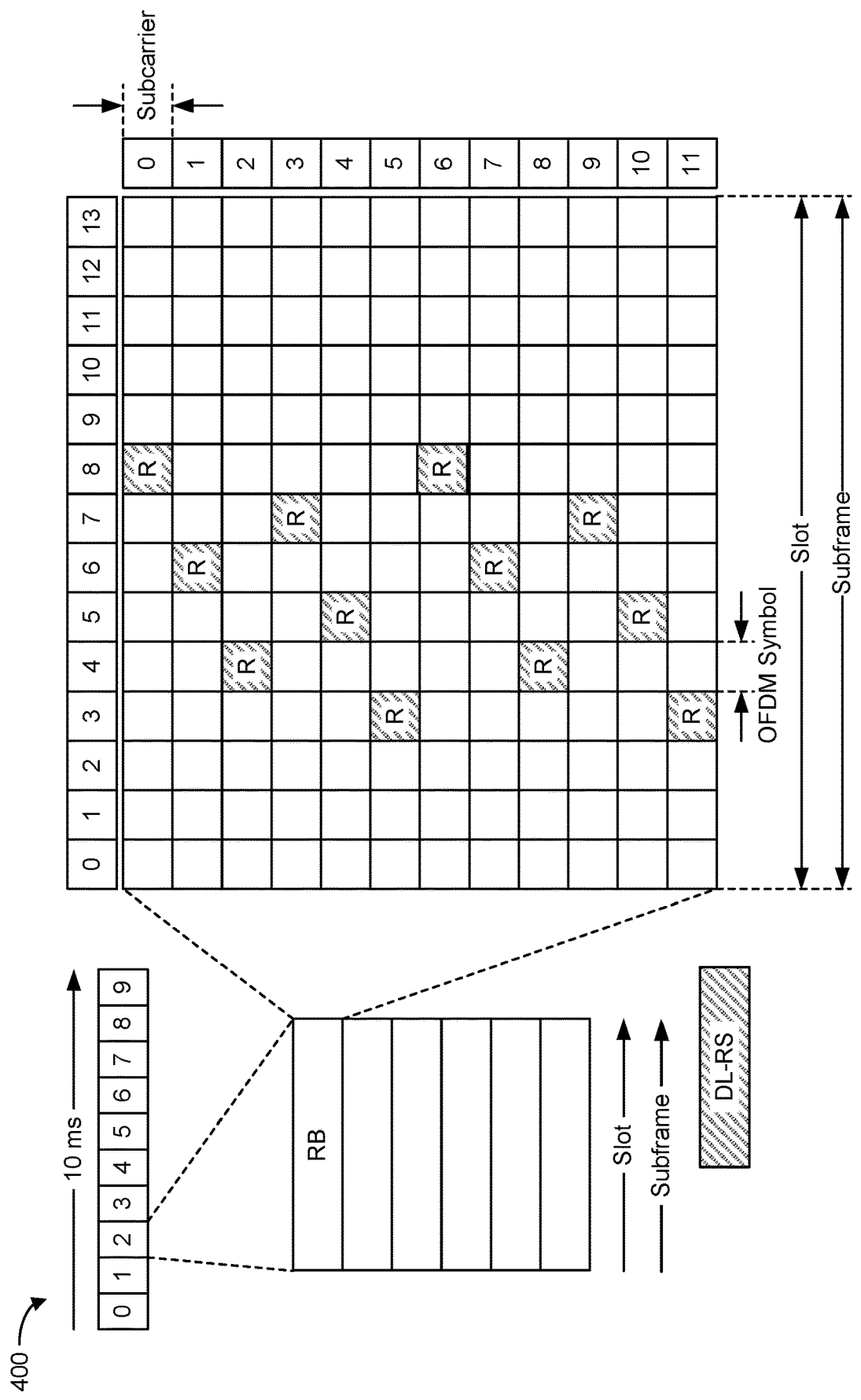

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4 illustrates exemplary locations of REs carrying DL-RS (labeled "R").

FIG. 4B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number

TABLE 1

| μ | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORE-SET). Thus, the frequency component of the PDCCH shown in FIG. 4B is illustrated as less than a single BWP in the frequency domain. Note that although the illustrated CORE-SET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Even when there is no traffic being transmitted from the network to a UE, the UE is expected to monitor every downlink subframe on the PDCCH. This means that the UE has to be "on," or active, all the time, even when there is no traffic, since the UE does not know exactly when the network will transmit data for it. However, being active all the time is a significant power drain for a UE.

To address this issue, a UE may implement discontinuous reception (DRX) and/or connected-mode discontinuous reception (CDRX) techniques. DRX and CDRX are mechanisms in which a UE goes into a "sleep" mode for certain periods of time and "wakes up" for other periods of time. During the wake, or active, periods, the UE checks to see if there is any data coming from the network, and if there is not, goes back into sleep mode.

To implement DRX and CDRX, the UE and the network need to be synchronized. In a worst-case scenario, the network may attempt to send some data to the UE when the UE is in sleep mode, and the UE may wake up when there is no data to be received. To prevent such scenarios, the UE and the network should have a well-defined agreement about when the UE can be in sleep mode and when the UE should be awake/active. Note that DRX includes CDRX, and thus, references to DRX refer to both DRX and CDRX, unless otherwise indicated.

The network (e.g., serving cell) can configure the UE with the DRX/CDRX timing using an RRC Connection Reconfiguration message (for CDRX) or an RRC Connection Setup message (for DRX). The network can signal the following parameters to the UE.

TABLE 2

| DRX Parameter | Description |
| --- | --- |
| DRX Cycle | The duration of one 'ON time' plus one 'OFF time.' (This value is not explicitly specified in RRC messages - it is calculated by the subframe time and "long DRX cycle start offset.") |
| ON Duration Timer | The duration of 'ON time' within one DRX cycle. |
| DRX Inactivity Timer | How long a UE should remain 'ON' after the reception of a PDCCH. When this timer is on, the UE remains in the 'ON state,' which may extend the ON period into the period that would be the 'OFF' period otherwise. |
| DRX Retransmission Timer | The maximum number of consecutive PDCCH subframes the UE should remain active to wait for an incoming retransmission after the first available retransmission time. |
| Short DRX Cycle | DRX cycle that can be implemented within the 'OFF' period of a long DRX cycle. |
| DRX Short Cycle Timer | The consecutive number of subframes the UE should follow the short DRX cycle after the DRX inactivity timer has expired. |

Figure 5A:
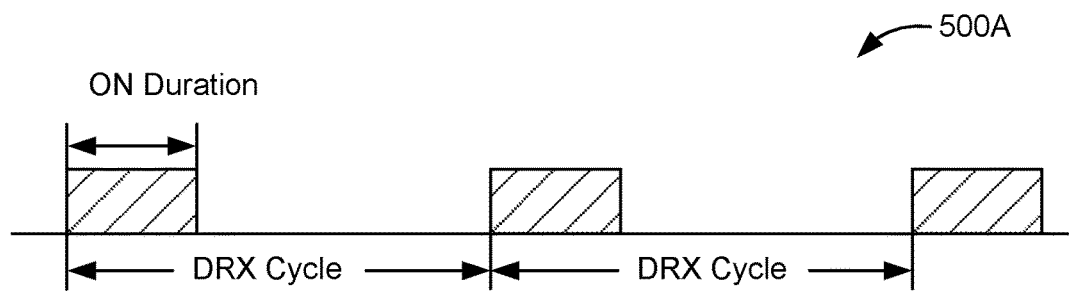
FIGS. 5A to 5D illustrate exemplary discontinuous reception (DRX) configurations, according to aspects of the disclosure.
Figure 5B:
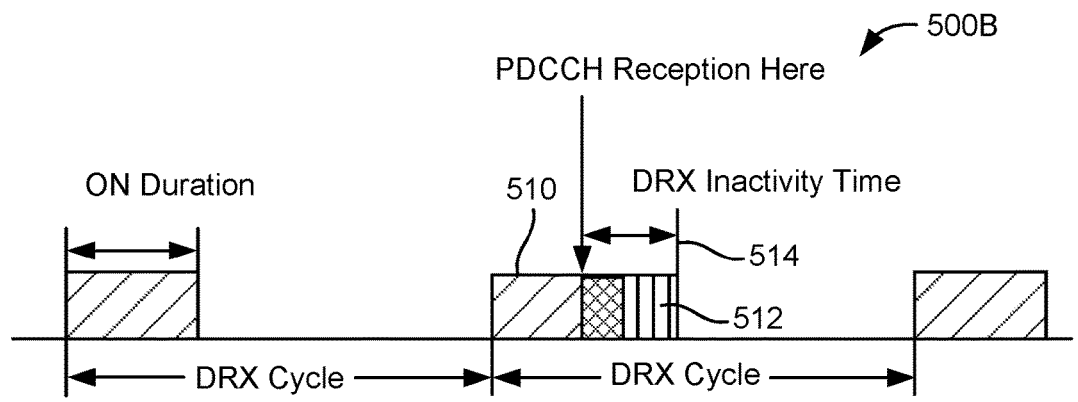

FIGS. 5A to 5D illustrate exemplary DRX cycles, according to aspects of the disclosure. FIG. 5A illustrates an exemplary DRX cycle 500A in which a long DRX cycle (the time from the start of one ON duration to the start of the next ON duration) is configured and no PDCCH is received during the cycle. FIG. 5B illustrates an exemplary DRX cycle 500B in which a long DRX cycle is configured and a PDCCH is received during an ON duration 510 of the second DRX cycle illustrated. Note that the ON duration 510 ends at time 512. However, the time that the UE is awake/active (the "active time") is extended to time 514 based on the length of the DRX inactivity timer and the time at which the PDCCH is received. Specifically, when the PDCCH is received, the UE starts the DRX inactivity timer and stays in the active state until the expiration of that timer (which is reset each time a PDCCH is received during the active time).

Figure 5C:
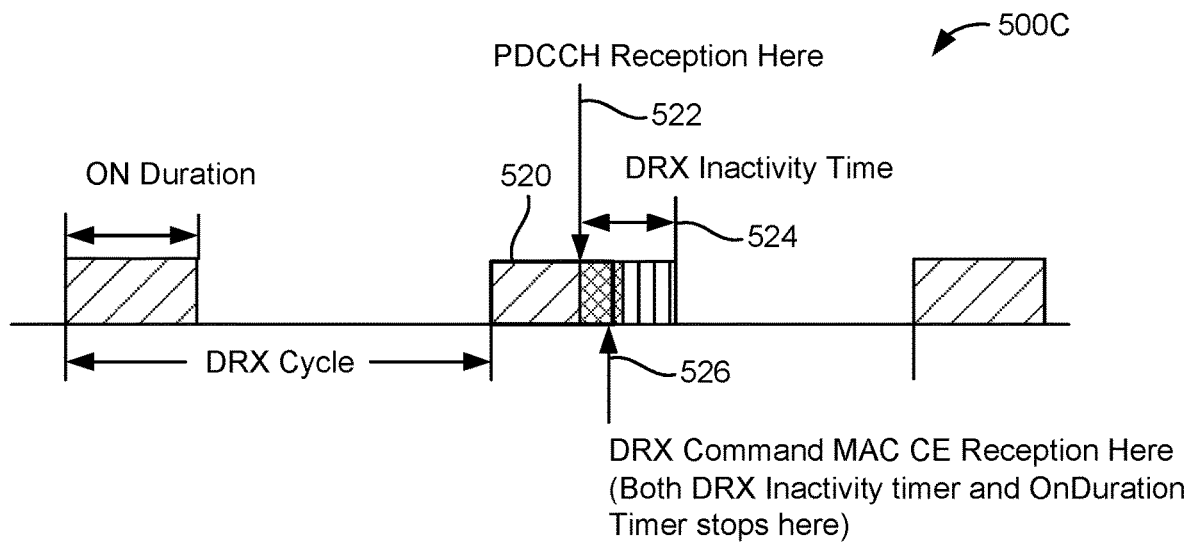

FIG. 5C illustrates an exemplary DRX cycle 500C in which a long DRX cycle is configured and a PDCCH and a DRX command MAC control element (MAC-CE) are received during an ON duration 520 of the second DRX cycle illustrated. Note that the active time beginning during ON duration 520 would normally end at time 524 due to the reception of the PDCCH at time 522 and the subsequent expiration of the DRX inactivity timer at time 524, as discussed above with reference to FIG. 5B. However, in the example of FIG. 5C, the active time is shortened to time 526 based on the time at which the DRX command MAC-CE, which instructs the UE to terminate the DRX inactivity timer and the ON duration timer, is received.

Figure 5D:
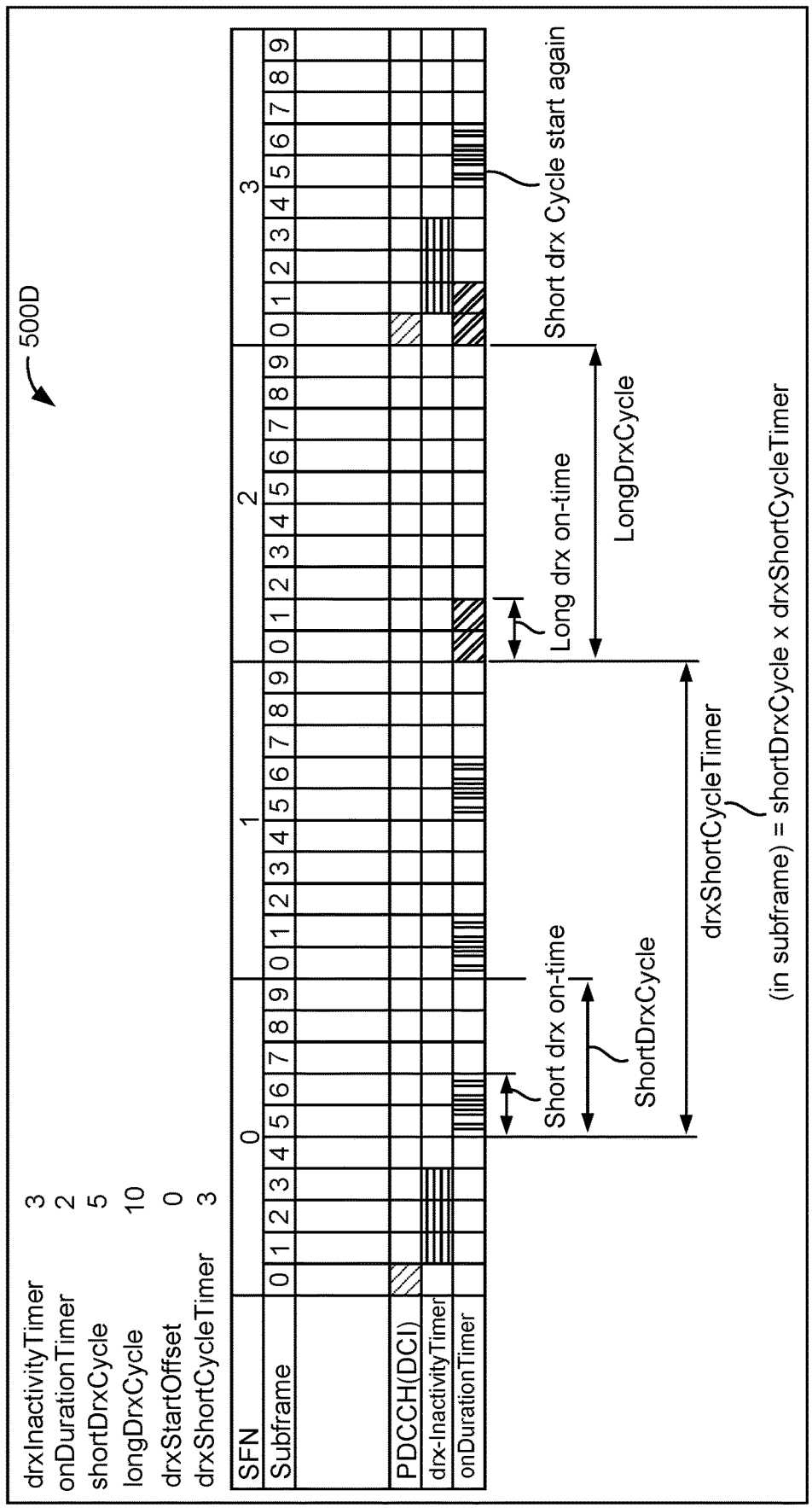

FIG. 5D illustrates an exemplary DRX cycle 500D in which both a long DRX cycle and a short DRX cycle are configured and no PDCCH is received during the cycle. In the example of FIG. 5D, the DRX inactivity timer is three subframes in length, the ON duration timer is two subframes in length, the short DRX cycle is five subframes in length, the long DRX cycle is 10 subframes in length, the DRX start offset is zero subframes in length, and the DRX short cycle timer is three subframes in length. When CDRX is configured and the last DCI (i.e., PDCCH) has been received (e.g., SFN='0,' subframe='0'), the UE starts the DRX inactivity timer and remains in the active state until the DRX inactivity timer expires (e.g., SFN='0,' subframe='3'). After the DRX inactivity timer expires, and if the UE is configured for a short DRX cycle, the short DRX cycle begins and the UE starts the DRX short cycle timer (e.g., SFN='0,' subframe='5'). If no DCI (i.e., no PDCCH) is received before expiration of the DRX short cycle timer (e.g., SFN='1,' subframe='9'), the long DRX cycle begins (e.g., SFN='2,' subframe='0'). If any DCI (PDCCH) is received during the active time of any DRX cycle, the UE restarts the DRX inactivity timer and remains in the active state until the expiration thereof.

The active time of a DRX cycle is the time during which the UE is considered to be monitoring the PDCCH. The active time may include the time during which the ON duration timer is running, the DRX inactivity timer is running, the DRX retransmission timer is running, the MAC contention resolution timer is running, a scheduling request has been sent on the physical uplink control channel (PUCCH) and is pending, an uplink grant for a pending HARQ retransmission can occur and there is data in the corresponding HARQ buffer, a PDCCH indicating a new transmission addressed to the cell radio network temporary identifier (C-RNTI) of the UE has not been received after successful reception of a random access response (RAR) for the preamble not selected by the UE, and in the non-contention based random access, after receiving the RAR, the UE should be in an active state until the PDCCH indicating new transmission addressed to the C-RNTI of the UE is received.

Note that the timing above is described in terms of subframes, but alternatively, it may be defined in terms of slots, milliseconds, or the like.

Currently, CDRX is defined per MAC entity, even when carrier aggregation is enabled across different numerologies (see Table 1). That is, the CDRX configuration is the same for each component carrier, regardless of the numerology employed on that carrier. For example, key parameters, such as DRX cycle, ON duration timer, and DRX inactivity timer, are defined independently of the subcarrier spacing (SCS) on the component carrier. That is, they are defined in milliseconds rather than number of slots or symbols. Table 3 illustrates various CDRX RRC parameters, their units of length, and exemplary values.

TABLE 3

| Parameter | Length | Example Values |
| --- | --- | --- |
| drx-onDurationTimer | ms | 1/32, . . . , 31/32, 1, 2, 3, 4, 5, 6, 8, 10, 20, 30, 40, 50, 60, 80, 100, 200, 300, 400, 500, 600, 800, 1000, 1200, 1600 |
| drx-InactivityTimer | ms | 0, 1, 2, 3, 4, 5, 6, 8, 10, 20, 30, 40, 50, 60, 80, 100, 200, 300, 500, 750, 1280, 1920, 2560 |
| drx-HARQ-RTT-TimerDL | symbol | 0, . . . , 56 |
| drx-HARQ-RTT-TimerUL | symbol | 0, . . . , 56 |
| drx-RetransmissionTimerDL | slot | 0, 1, 2, 4, 6, 8, 16, 24, 33, 40, 64, 80, 96, 112, 128, 160, 320 |
| drx-RetransmissionTimerUL | slot | 0, 1, 2, 4, 6, 8, 16, 24, 33, 40, 64, 80, 96, 112, 128, 160, 320 |
| drx-LongCycleStartOffset | ms | 10 (0 . . . 9), 20 (0 . . . 19), 32 (0 . . . 31), 40 (0 . . . 39), 60 (0 . . . 59), 64 (0 . . . 63), 70 (0 . . . 69), 80 (0 . . . 79), 128 (0 . . . 127), 160 (0 . . . 159), 256 0 . . . 255), 320 (0 . . . 319), 512 (0 . . . 511), 640 (0 . . . 639), 1024 (0 . . . 1023), 1280 (0 . . . 1279), 2048 (0 . . . 2047), 2560 (0 . . . 2559), 5120 (0 . . . 5119), 10240 (0 . . . 10239) |
| drx-ShortCycle | ms | 2, 3, 4, 5, 6, 7, 8, 10, 14, 16, 20, 30, 32, 35, 40, 64, 80, 128, 160, 256, 320, 512, 640 |
| drx-ShortCycleTimer | drx-ShortCycle | 1, . . . , 16 |
| drx-SlotOffset | 1/32 ms | 0, . . . , 31 |

As can be seen in Table 3, all but the DRX HARQ round-trip-time (RTT) timers and DRX retransmission timers are defined independently of the SCS (insofar as symbol and slot length depend on the SCS). However, due to the different numerologies, there is no straightforward trade-off between power savings and scheduling flexibility (to improve latency) for component carriers operating in different frequency ranges, such as FR1 and FR2. As such, it would be beneficial for a UE in carrier aggregation mode to be able to apply one CDRX configuration to one component carrier and a different CDRX configuration to another component carrier, such as in an FR1 plus FR2 carrier aggregation mode, to improve the UE's power consumption without sacrificing network-side scheduling latency.

Accordingly, the present disclosure provides techniques for enabling a UE to use multiple CDRX configurations (referred to herein as "multi-CDRX") when operating in carrier aggregation mode. For example, in FR1 plus FR2 carrier aggregation (i.e., one or more FR1 component carriers and one or more FR2 component carriers), CDRX can be configured per frequency range. In inter-band carrier aggregation (i.e., one or more component carriers in one frequency band and one or more component carriers in another frequency band), CDRX can be configured per band. For mixed numerologies carrier aggregation (i.e., one or more component carriers with a first numerology and one or more component carriers with a different numerology), CDRX can be configured per cell group, where each cell group contains a single numerology or mixed numerologies.

There are at least two levels of independence between the CDRX configurations for different sets of component carriers (e.g., sets of component carriers in different frequency ranges, bands, or cell groups). As a first level of independence, the CDRX configurations may be fully independent. That is, all of the RRC parameters can be fully configurable per set of component carriers, or only the SCS-independent parameters can be independent. CDRX operation would be fully independent within a set of component carriers (similar to using different MAC entities). Note that in order to have full independence, each set of component carriers would need to have its own PUCCH configured.

Figure 6A:
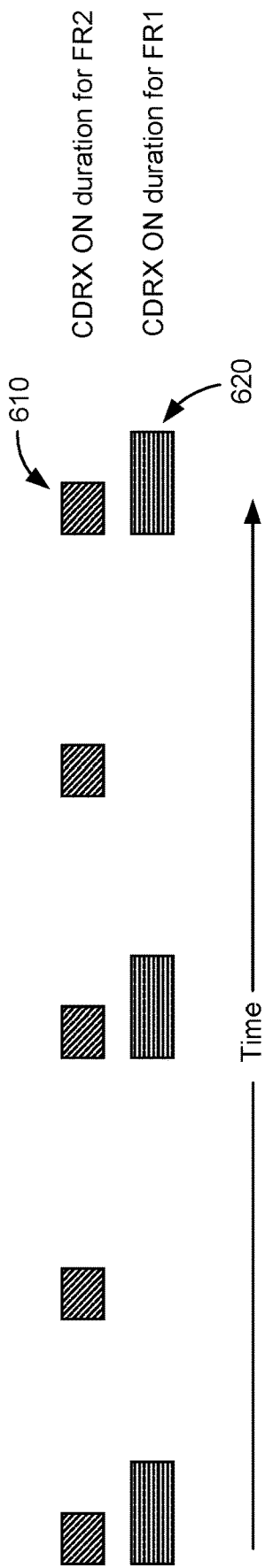

As a second level of independence, the CDRX configurations may be partially independent. In this case, there may be independent parameters, but the DRX cycles are aligned. That is, a long DRX cycle in the CDRX parameters for one set of component carriers would be a multiple of another long DRX cycle in the CDRX parameters for another set of component carriers. This is illustrated in FIG. 6A. In another scenario, there may be independent parameters, and different CDRX configurations would have the same DRX cycle and offset (meaning the start of the ON duration is aligned), but the ON duration and inactivity timer of one set of CDRX parameters is shorter than the other.

FIG. 6A illustrates an example of two partially independent CDRX configurations, according to aspects of the disclosure. In the example of FIG. 6A, the ON durations for a CDRX configuration 610 for FR2 and a CDRX configuration 620 for FR1 are shown. As can be seen, while the ON durations for the CDRX configuration 610 for FR2 are shorter and more frequent than the ON durations for the CDRX configuration 620 for FR1, the start of an ON duration for the CDRX configuration 620 for FR1 begins at the start of every other ON duration for the CDRX configuration 610 for FR2. As such, the length of the DRX cycle for the CDRX configuration 620 for FR1 is twice as long (i.e., a multiple of '2') as the length of the DRX cycle for the CDRX configuration 610 for FR2. Note that a longer DRX cycle will generally have a longer ON duration, and a shorter DRX cycle will generally have a shorter ON duration, as shown.

A benefit of aligning the start of different DRX cycles is that, while there may be separate RF components (e.g., radios 311, 323) for each frequency range, the baseband (e.g., modem 335) can still be shared. It is better for the UE to wake up both RF components together, in terms of power savings and signaling efficiency. In addition, the MAC entity is the same across the different frequency ranges. As such, the different frequency ranges (FR1 and FR2 in the example of FIG. 6A) may share the same PUCCH, making it easier to maintain the HARQ processing and retransmission.

Partially independent CDRX configurations may either have common triggering with independent timers or independent triggering. The different timers include the drx-HARQ-RTT-TimerDL, drx-HARQ-RTT-TimerUL, drx-RetransmissionTimerDL, drx-RetransmissionTimerUL, drx-onDurationTimer, drx-InactivityTimer, and drx-ShortCycleTimer.

For common triggering with independent timers, all of the sets of component carriers become active (i.e., come out of the inactive state) simultaneously, for example, based on an uplink grant (i.e., DCI format 0_0 or 0_1) in one set of component carriers (e.g., FR1 component carriers). If one or more sets of component carriers are already outside their active time (e.g., FR2 component carriers), a certain offset may be allowed to prepare the radio to wake-up for those set(s) of component carriers. Alternatively, they may become active starting at the next ON duration in that set of component carriers. All the sets of component carriers become active during a pending scheduling request (SR) or a pending RAR.

Each set of component carriers enters the inactive state (i.e., OFF state) independently with respect to its own inactivity status. That is, the active time of each set of component carriers is based on the drx-onDurationTimer, drx-InactivityTimer, drx-RetransmissionTimerDL, drx-RegransmissionTimerUL timers for that set of component carriers. In addition, a DRX command MAC-CE may be common to all the sets of component carriers, or may be applicable to the set of component carriers in which the MAC-CE is received, or may indicate one or more of the sets of component carriers.

For independent triggering, each set of component carriers becomes active based on an uplink or downlink grant for that set of component carriers. In an aspect, the grant may be a configured grant (i.e., semi-persistent scheduling). In that case, the triggering is based on the received MAC PDU via semi-persistent scheduling. In addition, the grant may be for a pending scheduling request or pending RAR. A pending scheduling request affects the set of component carriers in which the PUCCH (with the scheduling request) is received. A pending RAR affects the set of component carriers within which the RACH is performed. Otherwise, the remaining aspects, such as each set of component carriers entering the inactive state based on its own timers and the commonality of the DRX command MAC-CE (i.e., common to all the sets of component carriers, or the set of component carriers in which the MAC-CE is received, or the sets of component carriers indicated in the MAC-CE) are the same whether the triggering is common or independent. Further, independent triggering can be used with both fully independent and partially independent CDRX configurations.

A UE in CDRX mode will occasionally need to handle aperiodic events, such as PUCCH and SRS transmissions. An aperiodic event is an event that does not occur at regular intervals. Instead, it may occur in response to some event. For example, a UE may transmit channel state information (CSI) (on the PUCCH) or SRS when requested by the base station, rather than at regular intervals. Such aperiodic events can be handled independently or jointly within a set of component carriers. Regarding independent handling, in a current symbol, if the MAC entity would not be in active time considering grants/assignments/DRX command MAC-CE/long DRX command MAC-CE received and scheduling request sent until 4 ms, for example, prior to that symbol when evaluating all DRX active time conditions (as defined above), then the UE does not transmit periodic SRS or semi-persistent SRS. Regarding PUCCH transmission, if CSI masking is setup by upper layers, then in a current symbol, if drx-onDurationTimer would not be running considering grants/assignments/DRX command MAC-CE/long DRX command MAC-CE received until 4 ms prior to that symbol when evaluating all DRX active time conditions (as defined above), then the UE does not report CSI on the PUCCH. Otherwise, in a current symbol, if the MAC entity would not be in active time considering grants/assignments/DRX command MAC-CE/long DRX command MAC-CE received and SR sent until 4 ms prior to that symbol when evaluating all DRX active time conditions (as defined above), then the UE does not report CSI on the PUCCH or semi-persistent CSI on the physical uplink shared channel (PUSCH). Regardless of whether the MAC entity is monitoring the PDCCH or not, the MAC entity transmits HARQ feedback, aperiodic CSI on the PUSCH, and aperiodic SRS when such is expected. The independent handling of aperiodic events within a group can be implemented for fully independent CDRX configurations or partially independent CDRX configurations.

Joint handling is applicable when there is a single PUCCH across all sets of component carriers. In a current symbol, if the MAC entity would not be in active time for all sets of component carrier, or if the MAC entity would not be in active time for the set of component carriers with the SRS, then the UE does not transmit a periodic SRS or a semi-persistent SRS. If CSI masking is setup by the upper layers, then, in a current symbol, if drx-onDurationTimer would not be running for all sets of component carriers, or if drx-onDurationTimer would not be running for the set of component carriers with the PUCCH, then the UE does not report CSI on the PUCCH. Otherwise, in a current symbol, if the MAC entity would not be in active time for all sets of component carriers, or if the MAC entity would not be in active time for the sets of component carriers with the PUCCH or semi-persistent CSI on the PUSCH, then the UE does not report CSI on the PUCCH or semi-persistent CSI on the PUSCH. Regardless of whether or not the MAC entity is monitoring the PDCCH (across sets of component carriers), the MAC entity transmits HARQ feedback, aperiodic CSI on the PUSCH, and aperiodic SRS when such is expected.

The following is an example of dual CDRX in FR1 plus FR2 carrier aggregation with a single PUCCH group. As noted above, CDRX is defined per MAC entity across carrier aggregations including different numerologies. Currently, a UE's CDRX configuration is common, even across FR1 and FR2. Certain parameters, such as DRX cycle, drx-OnDurationTimer, and drx-InactivityTimer, are defined as SCS-independent values (i.e., defined in milliseconds, see Table 3). There is not a straightforward tradeoff between power saving and scheduling flexibility (to reduce latency) for both FR1 and FR2 component carriers. As such, it would be beneficial to enable dual CDRX (i.e., CDRX per frequency range) for FR1 and FR2 carrier aggregation.

Important CDRX parameters related to the UE's power consumption include the drx-OnDuration duty cycle (i.e., together with the DRX cycle) and the drx-InactivityTimer. For simplicity, the FR1 CDRX configuration and the FR2 CDRX configuration can share the same DRX cycle and offset, meaning the start of the ON duration is aligned. However, the ON duration and inactivity timer can be independent, meaning the ON duration and inactivity timer for the FR2 CDRX configuration can be shorter than for the FR1 CDRX configuration. This is illustrated in FIG. 6B, in which a CDRX configuration 650 for FR1 has the same DRX cycle and offset as a CDRX configuration 660 for FR2, but has a longer ON duration than the CDRX configuration 660 for FR2. As a specific example, the DRX long cycle could be 160 ms, the drx-OnDuration for FR1 could be 5 ms and for FR2 could be 1 ms, and the drx-InactivityTimer for FR1 could be 100 ms and for FR2 could be 10 ms.

Continuing to refer to the dual CDRX in FR1 plus FR2 carrier aggregation example, regarding data handling, the FR1 and FR2 CDRX configurations may be independently triggered and have independent timers. Regarding independent triggering, each frequency range may become active based on a grant in the frequency range, each frequency range may become active based on a MAC PDU in SPS in the frequency range, or only FR1 may become active during a pending scheduling request or pending RAR. Regarding independent timers, each set of component carriers (for FR1 and FR2) may enter the CDRX inactive state independently based on their own inactivity status. More specifically, the active time for each set of component carriers is independent per frequency range based on drx-onDurationTimer, drx-InactivityTimer, drx-RetransmissionTimerDL, and drx-RegransmissionTimerUL. In addition, the timers are maintained independently. Regarding reception of DRX command MAC-CEs, a DRX command MAC-CE would be common to each of FR1 and FR2.

Still referring to the dual CDRX in FR1 plus FR2 carrier aggregation example, regarding SRS and aperiodic event handling, the example assumes a single PUCCH group. Regarding SRS handling, in the current symbol, if the MAC entity would not be in active time for a frequency range (FR1 or FR2) considering grants/assignments/DRX command MAC-CE/long DRX command MAC-CE received and scheduling request sent until 4 ms prior to the current symbol when evaluating all DRX active time conditions (as defined above), the UE does not transmit periodic SRS and semi-persistent SRS in the frequency range.

Regarding aperiodic event handling, regardless of whether or not the MAC entity is monitoring the PDCCH (across FR1 and FR2), the MAC entity transmits HARQ feedback, aperiodic CSI on the PUSCH, and aperiodic SRS when such is expected. For HARQ feedback, the PUCCH on FR1 for HARQ feedback is still sent while FR1 is in a DRX off duration. For aperiodic CSI on the PUSCH, CSI-RS monitoring occurs during active time in the frequency range with the CSI-RS. It is a network responsibility to ensure that a triggered aperiodic CSI-RS falls during a period of active time.

Continuing to refer to the dual CDRX in FR1 plus FR2 carrier aggregation example, regarding PUCCH handling, a single PUCCH group is assumed. A single PUCCH group means a PUCCH is configured in only one component carrier (e.g., the PCell) in FR1 plus FR2 carrier aggregation. For CSI handling, if CSI masking is setup by the upper layers, then in the current symbol, if drx-onDurationTimer for FR1 would not be running considering grants/assignments/DRX command MAC-CE/long DRX command MAC-CE received until 4 ms, for example, prior to the current symbol when evaluating all DRX active time conditions (as defined above), then the UE does not report CSI on the PUCCH. Otherwise, (1) in the current symbol, if the MAC entity would not be in active time for FR1 for considering grants/assignments/DRX command MAC-CE/long DRX command MAC-CE received and SR sent until 4 ms prior to the current symbol when evaluating all DRX active time conditions (as defined above), then the UE does not report CSI on the PUCCH. Or, (2) in the current symbol, if the MAC entity would not be in active time for a frequency range (FR1 or FR2) for considering grants/assignments/DRX command MAC-CE/long DRX command MAC-CE received and scheduling request sent until 4 ms prior to the current symbol when evaluating all DRX active time conditions (as defined above), then the UE does not report semi-persistent CSI on the PUSCH in that FR.

Figure 7:
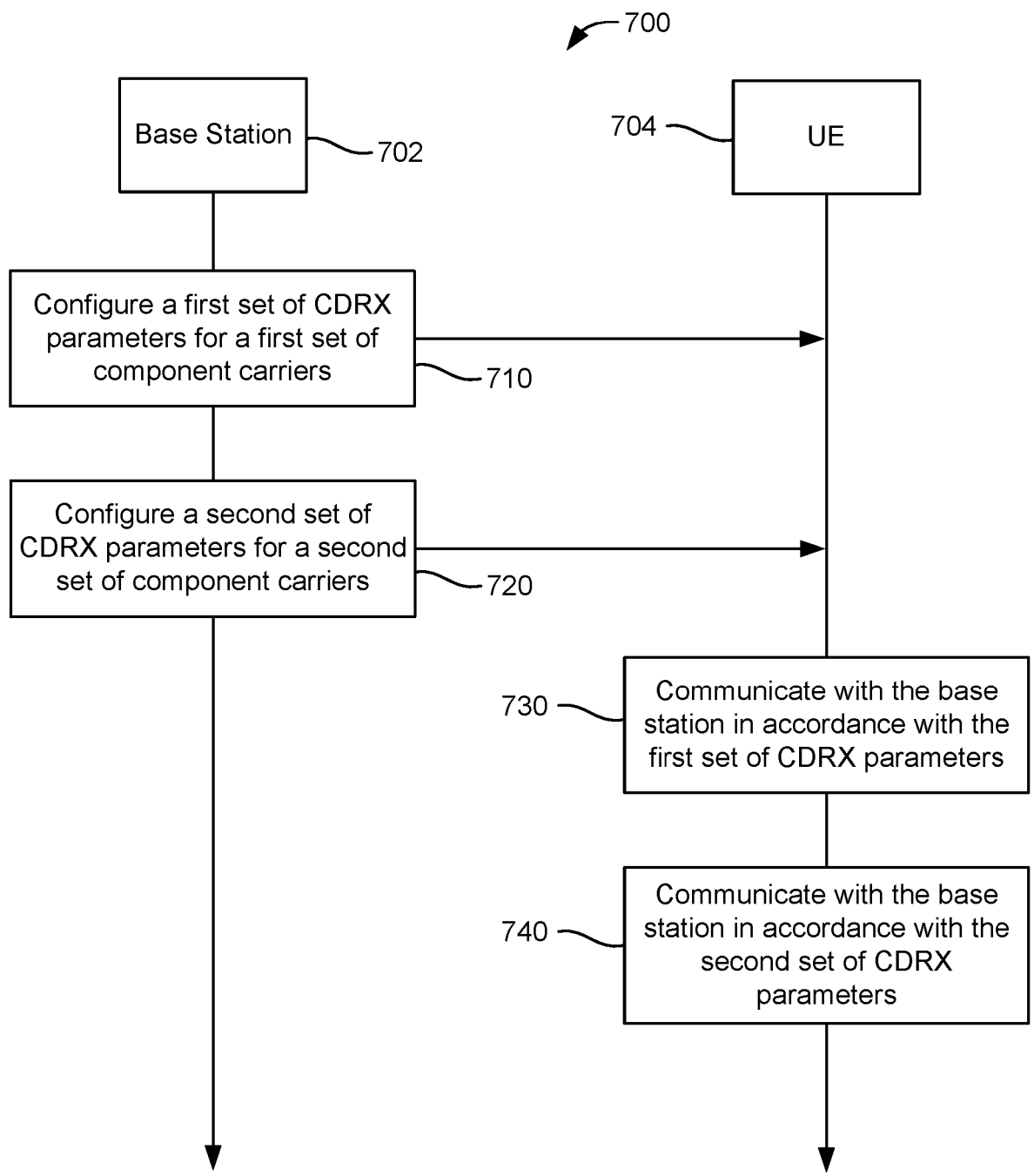
FIGS. 7 and 8 illustrate exemplary methods of wireless communication, according to aspects of the disclosure.

FIG. 7 illustrates an exemplary method 700 of wireless communication, according to aspects of the disclosure. At 710, a base station 702 (e.g., any of the base stations described herein) configures a UE (e.g., any of the UEs described herein) operating in a carrier aggregation mode with a first set of CDRX parameters for a first set of component carriers associated with a first set of numerologies. The first set of CDRX parameters may be defined in absolute time (e.g., in symbols, slots, subframes, milliseconds, transmission time intervals (TTIs), etc.). For example, the first set of CDRX parameters may include a drx-onDurationTimer, a drx-InactivityTimer, a drx-LongCycleStartOffset, a drx-ShortCycle, a drx-ShortCycleTimer, a drx-SlotOffset, or any combination thereof. The first set of component carriers may be a set of component carriers in a first FR (e.g., FR1 or FR2), in a first frequency band, or in a first group of cells. The first set of numerologies may be one or more numerologies from Table 1.

At 720, the base station 702 configures the UE with a second set of CDRX parameters for a second set of component carriers associated with a second set of numerologies. The second set of CDRX parameters may be defined in absolute time (e.g., in milliseconds). For example, the second set of CDRX parameters may include a drx-onDurationTimer, a drx-InactivityTimer, a drx-LongCycleStartOffset, a drx-ShortCycle, a drx-ShortCycleTimer, a drx-SlotOffset, or any combination thereof. The second set of component carriers may be a set of component carriers in a second frequency range (e.g., FR1 or FR2), in a second frequency band, or in a second group of cells different from the first set of component carriers. The second set of numerologies may be one or more numerologies from Table 1, the parameters of which may or may not be different than the parameters of the first set of numerologies.

At 730, the UE communicates with the base station in accordance with the first set of CDRX parameters. For example, the UE receives downlink transmissions from the base station on the first set of component carriers during ON periods for the first set of component carriers defined by the first set of CDRX parameters and sleeps during OFF periods for the first set of component carriers defined by the first set of CDRX parameters.

At 740, the UE communicates with the base station in accordance with the second set of CDRX parameters. For example, the UE receives downlink transmissions from the base station on the second set of component carriers during ON periods for the second set of component carriers defined by the second set of CDRX parameters and sleeps during OFF periods for the second set of component carriers defined by the second set of CDRX parameters.

Figure 8:
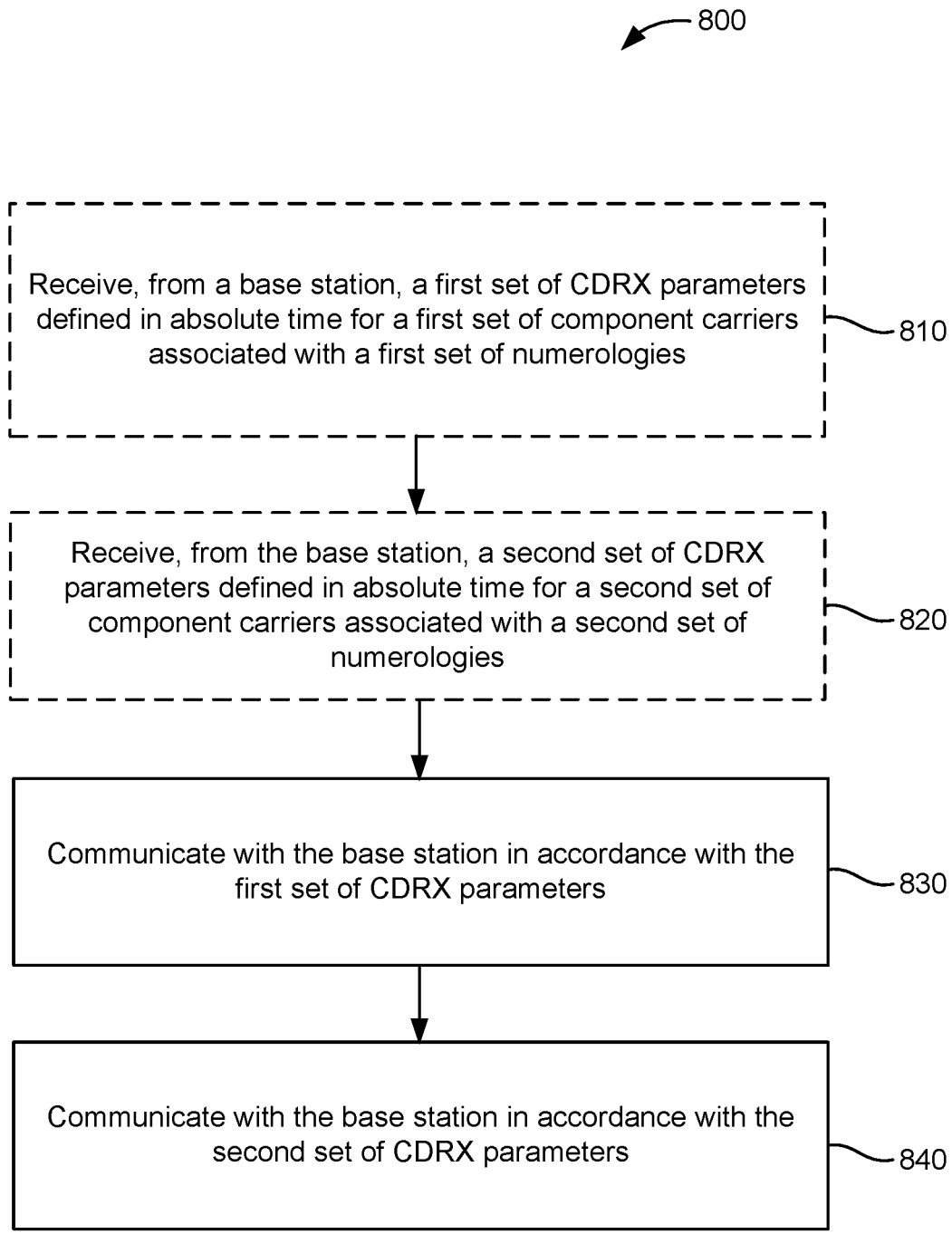

FIG. 8 illustrates an exemplary method 800 of wireless communication, according to aspects of the disclosure. The method 800 may be performed by a UE operating in a carrier aggregation mode, such as any of the UEs described herein.

At 810, the UE may be configured by a base station (e.g., any of the base stations described herein) with a first set of CDRX parameters for a first set of component carriers associated with a first set of numerologies. The first set of CDRX parameters may be defined in absolute time (e.g., in symbols, slots, subframes, milliseconds, TTIs, etc.). For example, the first set of CDRX parameters may include a drx-onDurationTimer, a drx-InactivityTimer, a drx-LongCycleStartOffset, a drx-ShortCycle, a drx-ShortCycleTimer, a drx-SlotOffset, or any combination thereof. The first set of component carriers may be a set of component carriers in a first frequency range (e.g., FR1 or FR2), in a first frequency band, or in a first group of cells. The first set of numerologies may be one or more numerologies from Table 1. In an aspect, operation 810 may be performed by receiver(s) 312 and/or processing system 332, which may be considered "means for" performing operation 810.

At 820, the UE may be configured by the base station with a second set of CDRX parameters for a second set of component carriers associated with a second set of numerologies. The second set of CDRX parameters may be defined in absolute time (e.g., in milliseconds). For example, the second set of CDRX parameters may include a drx-onDurationTimer, a drx-InactivityTimer, a drx-LongCycleStartOffset, a drx-ShortCycle, a drx-ShortCycleTimer, a drx-SlotOffset, or any combination thereof. The second set of component carriers may be a set of component carriers in a second frequency range (e.g., FR1 or FR2), in a second frequency band, or in a second group of cells different from the first set of component carriers. The second set of numerologies may be one or more numerologies from Table 1, the parameters of which may or may not be different than the parameters of the first set of numerologies. In an aspect, operation 820 may be performed by receiver(s) 312 and/or processing system 332, which may be considered "means for" performing operation 820.

Operations 810 and 820 are optional because the UE may have been be configured by a different base station or network entity than the base station with which it is communicating, or have determined the CDRX parameters itself and signaled them to the base station, or the like.

At 830, the UE communicates with the base station in accordance with the first set of CDRX parameters. For example, the UE may receive downlink transmissions from the base station on the first set of component carriers during ON periods for the first set of component carriers defined by the first set of CDRX parameters and sleeps during OFF periods for the first set of component carriers defined by the first set of CDRX parameters. In an aspect, operation 830 may be performed by receiver(s) 312 and/or processing system 332, which may be considered "means for" performing operation 830.

At 840, the UE communicates with the base station in accordance with the second set of CDRX parameters. For example, the UE may receive downlink transmissions from the base station on the second set of component carriers during ON periods for the second set of component carriers defined by the second set of CDRX parameters and sleeps during OFF periods for the second set of component carriers defined by the second set of CDRX parameters. In an aspect, operation 840 may be performed by receiver(s) and/or processing system 332, which may be considered "means for" performing operation 840.

Figure 9:
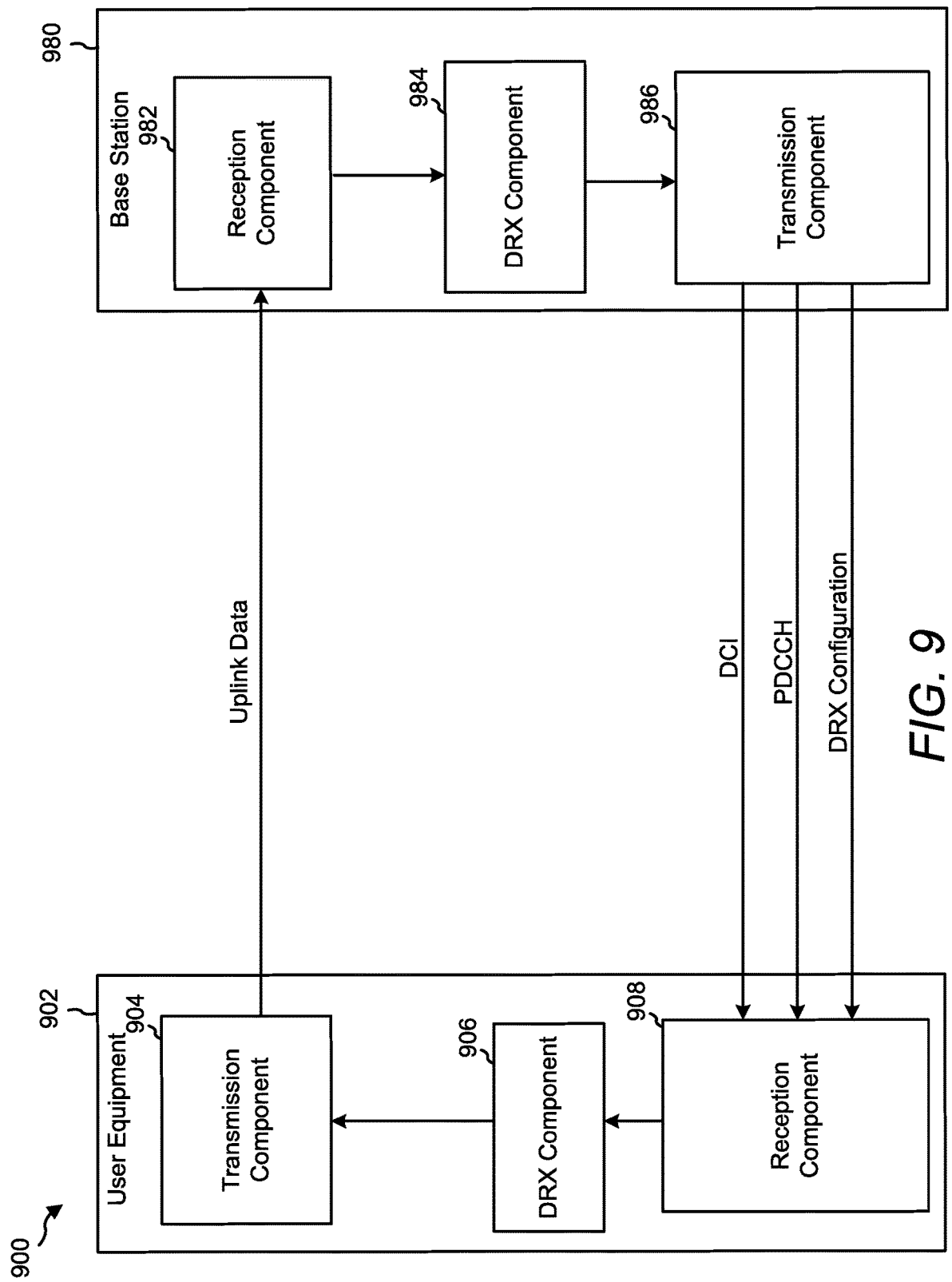
FIG. 9 is a conceptual data flow diagram illustrating the data flow between different means/components in exemplary apparatuses, according to aspects of the disclosure.

FIG. 9 is a conceptual data flow diagram 900 illustrating the data flow between different means/components in exemplary apparatuses 902 and 980, according to aspects of the disclosure. The apparatus 902 may be a UE (e.g., any of the UEs described herein) in communication with an apparatus 980, which may be a base station (e.g., any of the base stations described herein).

The apparatus 902 includes a transmission component 904, which may correspond to transmitter circuitry in UE 302 as depicted in FIG. 3A, including transmitter(s) 314 and/or processing system 332. The apparatus 902 further includes DRX component 906, which may correspond to processor circuitry in UE 302 as depicted in FIG. 3A, including processing system 332 and/or DRX component 342. The apparatus 902 further includes a reception component 908, which may correspond to receiver circuitry in UE 302 as depicted in FIG. 3A, including receiver(s) 312 and/or processing system 332.

The apparatus 980 includes a reception component 982, which may correspond to receiver circuitry in base station 304 as depicted in FIG. 3B, including receiver(s) 352 and/or processing system 384. The apparatus 980 further includes a DRX component 984, which may correspond to processor circuitry in base station 304 as depicted in FIG. 3B, including DRX component 388 and/or processing system 384. The apparatus 980 further includes a transmission component 986, which may correspond to transmission circuitry in base station 304 as depicted in FIG. 3B, including transmitter(s) 354 and/or processing system 332.

Referring to FIG. 9, the DRX component 984 generates sets of CDRX parameters for the apparatus 902 for each component carrier over which the apparatus 902 communicates with the apparatus 980. The transmission component 986 transmits downlink data to the reception component 908, including DCI communications, PDCCH communications, DRX configuration, or a combination thereof. Some or all of these communications may convey the sets of CDRX parameters generated by the DRX component 984. The reception component 908 receives the CDRX parameters and forwards them to the DRX component 906. The DRX component 906 uses the CDRX parameters to configure the transmission component 904 to transmit uplink data to the apparatus 980 in accordance with the CDRX parameters. The transmission component 904 transmits uplink data to the reception component 982 in accordance with the CDRX parameters.

One or more components of the apparatus 902 and apparatus 980 may perform each of the blocks of the algorithm in the aforementioned flowcharts of FIGS. 7 and 8. As such, each block in the aforementioned flowcharts of FIGS. 7 and 8 may be performed by a component, and the apparatus 902 and/or apparatus 980 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
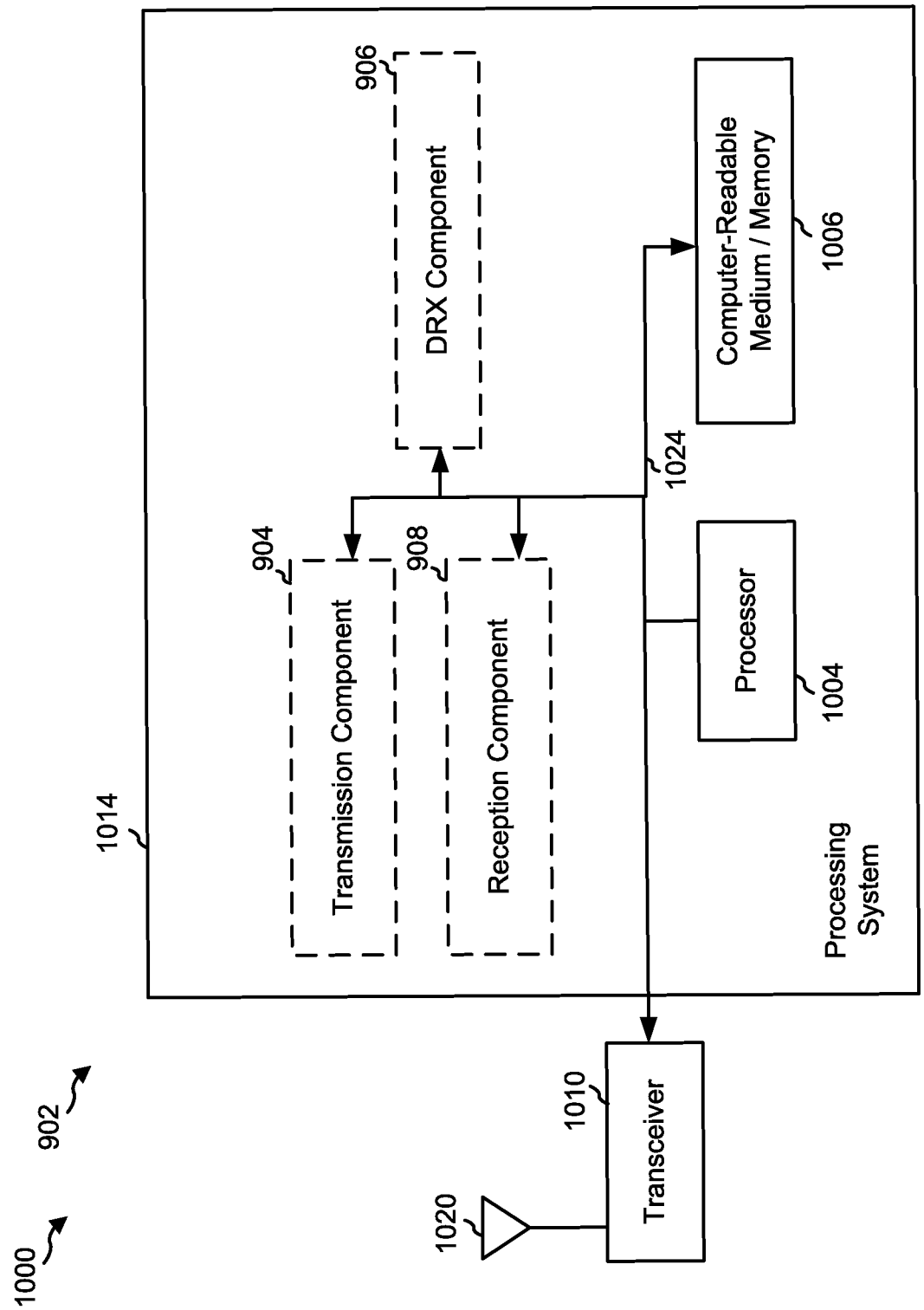
FIG. 10 is a diagram illustrating an example of a hardware implementation for an apparatus employing a processing system, according to aspects of the disclosure.

FIG. 10 is a diagram 1000 illustrating an example of a hardware implementation for an apparatus 902 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906 and 908, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 908. In addition, the transceiver 1010 receives information from the processing system 1014, specifically the transmission component 904, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906 and 98. The components may be software components running in the processor 1004, resident/stored in the computer readable medium/memory 1006, one or more hardware components coupled to the processor 1004, or some combination thereof. The processing system 1014 may be a component of the UE 302 of FIG. 3A and may include the memory component 340, and/or at least one of the WWAN transceiver 310, the processing system 332, and the DRX component 342.

In one configuration, the apparatus 902 (e.g., a UE) for wireless communication includes means for communicating with a base station in accordance with a first set of CDRX parameters defined in absolute time for a first set of component carriers associated with a first set of numerologies, and means for communicating with the base station in accordance with a second set of CDRX parameters defined in absolute time for a second set of component carriers associated with a second set of numerologies.

The aforementioned means may be one or more of the aforementioned components of the apparatus 902 and/or the processing system 1014 of the apparatus 902 configured to perform the functions recited by the aforementioned means. As described supra, the processing system 1014 may include the WWAN transceiver 310, the processing system 332, and the DRX component 342.

Figure 11:
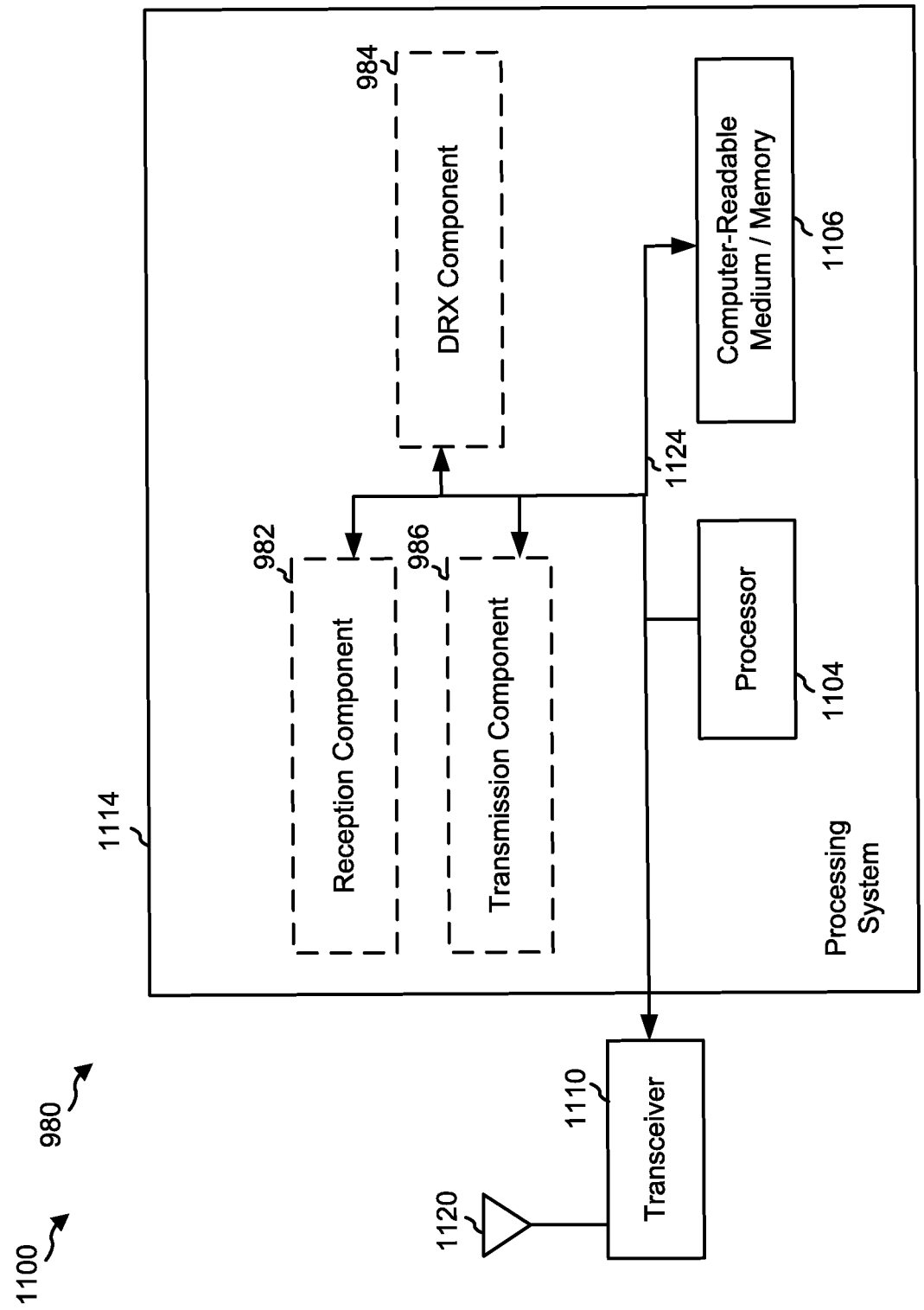
FIG. 11 is a diagram illustrating another example of a hardware implementation for an apparatus employing a processing system, according to aspects of the disclosure.

FIG. 11 is a diagram 1100 illustrating an example of a hardware implementation for an apparatus 980 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 982, 984 and 986, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 982. In addition, the transceiver 1110 receives information from the processing system 1114, specifically the transmission component 986, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 982, 984 and 986. The components may be software components running in the processor 1104, resident/stored in the computer readable medium/memory 1106, one or more hardware components coupled to the processor 1104, or some combination thereof. The processing system 1114 may be a component of the base station 304 of FIG. 3B and may include the memory component 386, and/or at least one of the WWAN transceiver 350, the processing system 384, and the DRX component 388.

In one configuration, the apparatus 980 (e.g., a base station) for wireless communication includes means for communicating with a UE in accordance with a first set of CDRX parameters defined in absolute time for a first set of component carriers associated with a first set of numerologies, and means for communicating with the UE in accordance with a second set of CDRX parameters defined in absolute time for a second set of component carriers associated with a second set of numerologies.

The aforementioned means may be one or more of the aforementioned components of the apparatus 980 and/or the processing system 1114 of the apparatus 980 configured to perform the functions recited by the aforementioned means. As described supra, the processing system 1114 may include the WWAN transceiver 350, the processing system 384, and the DRX component 388.

As used herein, the term "component" is intended to be broadly construed as hardware, firmware, and/or a combination of hardware and software. As used herein, a processor is implemented in hardware, firmware, and/or a combination of hardware and software.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE) operating in a carrier aggregation mode, comprising:
communicating with a base station in accordance with a first set of connected mode discontinuous reception (CDRX) parameters defined in milliseconds for a first set of component carriers associated with a first set of numerologies, wherein the first set of CDRX parameters defined in milliseconds comprises at least a first ON duration timer and a first inactivity timer; and
communicating with the base station in accordance with a second set of CDRX parameters defined in milliseconds for a second set of component carriers associated with a second set of numerologies, wherein the second set of CDRX parameters defined in milliseconds comprises at least a second ON duration timer and a second inactivity timer.

2. The method of claim 1, wherein the first set of CDRX parameters comprises a first set of radio resource control (RRC) parameters, and wherein the second set of CDRX parameters comprises a second set of RRC parameters.

3. The method of claim 2, wherein:
the first set of RRC parameters further comprises a first long cycle start offset timer, a first short cycle length, a first short cycle timer, a first slot offset, or any combination thereof, and
the second set of RRC parameters further comprises a second long cycle start offset timer, a second short cycle length, a second short cycle timer, a second slot offset, or any combination thereof.

4. The method of claim 1, wherein CDRX parameters of the first set of CDRX parameters are configured independently from CDRX parameters of the second set of CDRX parameters.

5. The method of claim 1, wherein a start time of a first CDRX cycle of the first set of CDRX parameters is aligned with a start time of a second CDRX cycle of the second set of CDRX parameters.

6. The method of claim 1, wherein each of the first and second sets of component carriers enters an inactive state independently based on one or more inactivity timers associated with the first and second sets of CDRX parameters.

7. The method of claim 1, wherein each of the first and second sets of component carriers enters an active state independently based on a separate grant for each of the first and second sets of component carriers.

8. The method of claim 1, wherein the UE does not transmit a sounding reference signal (SRS) on the first set of component carriers based on:
a medium access control (MAC) entity of the UE not being in an active state until a threshold period of time prior to a symbol in which the SRS is scheduled to be transmitted.

9. The method of claim 8, wherein the SRS is associated with the first set of component carriers.

10. The method of claim 1, wherein the UE does not report channel state information (CSI) on a physical uplink control channel (PUCCH) based on:
CSI masking being configured and an ON duration timer not running until within a threshold period of time prior to a symbol in which the PUCCH is scheduled to be transmitted.

11. The method of claim 10, wherein the PUCCH is associated with the first set of component carriers.

12. The method of claim 1, wherein the UE does not report CSI on a PUCCH based on:
a MAC entity of the UE not being in an active state until a threshold period of time prior to a symbol in which the PUCCH is scheduled to be transmitted.

13. The method of claim 1, wherein, regardless of being in an inactive state, a MAC entity of the UE transmits:
hybrid automatic repeat request (HARM) feedback,
aperiodic CSI on a physical uplink shared channel (PUSCH), and
aperiodic SRS.

14. The method of claim 1, wherein the UE does not transmit SRS on the first set of component carriers based on:
a MAC entity of the UE not being in an active state for both the first and second sets of component carriers, or
the MAC entity not being in an active state for the first or the second set of component carriers in which a grant for a PUCCH was received.

15. The method of claim 1, wherein the UE does not report CSI on a PUCCH based on:
CSI masking being configured and an ON duration timer not running for both the first and second sets of component carriers, or
the ON duration timer not running for the first or the second set of component carriers in which a grant for the PUCCH was received.

16. The method of claim 1, wherein the UE does not report CSI on a PUCCH based on:
a MAC entity of the UE not being in an active state for both the first and second sets of component carriers, or
the MAC entity not being in an active state for the first or the second set of component carriers in which a grant for the PUCCH was received.

17. The method of claim 1, wherein, regardless of being in an inactive state, a MAC entity of the UE transmits:
HARQ feedback,
aperiodic CSI on a PUSCH, and
aperiodic SRS.

18. The method of claim 1, wherein:
a subset of CDRX parameters of the first set of CDRX parameters are independent of sub carrier spacing associated with the first set of numerologies,
a subset of CDRX parameters of the second set of CDRX parameters are independent of subcarrier spacing associated with the second set of numerologies, and
the subset of CDRX parameters of the first set of CDRX parameters are independent of the subset of CDRX parameters of the second set of CDRX parameters.

19. The method of claim 18, wherein:
the subset of CDRX parameters of the first set of CDRX parameters comprises the first ON duration timer, the first inactivity timer, a first long cycle start offset timer, a first short cycle length, a first short cycle timer, a first slot offset, or any combination thereof, and
the subset of CDRX parameters of the second set of CDRX parameters comprises the second ON duration timer, the second inactivity timer, a second long cycle start offset timer, a second short cycle length, a second short cycle timer, a second slot offset, or any combination thereof.

20. The method of claim 1, wherein the first and second sets of component carriers become active during a pending scheduling request or a pending random access response.

21. The method of claim 1, further comprising:
receiving a MAC control element (MAC-CE) discontinuous reception (DRX) command, wherein the MAC-CE DRX command is common to both the first and second sets of component carriers, the first or the second set of component carriers in which the MAC-CE DRX command was received, or indicates that both of the first and second sets of component carriers are to enter an inactive state.

22. The method of claim 1, wherein:
the first set of component carriers comprises one or more component carriers operating in a first frequency range, and
the second set of component carriers comprises one or more component carriers operating in a second frequency range.

23. The method of claim 1, wherein:
the first set of component carriers comprises one or more component carriers operating in a first frequency band, and
the second set of component carriers comprises one or more component carriers operating in a second frequency band.

24. The method of claim 1, wherein:
the first set of component carriers comprises one or more component carriers of a first group of cells, and the second set of component carriers comprises one or more component carriers of a second group of cells.

25. The method of claim 24, wherein the first group of cells, the second group of cells, or both operate in accordance with a single numerology.

26. The method of claim 24, wherein the first group of cells, the second group of cells, or both operate in accordance with multiple numerologies.

27. A user equipment (UE) configured to operate in a carrier aggregation mode, comprising:
   a memory;
   at least one transceiver; and
   at least one processor communicatively coupled to the memory and the at least one transceiver, the at least one processor configured to:
      communicate, via the at least one transceiver, with a base station in accordance with a first set of connected mode discontinuous reception (CDRX) parameters defined in milliseconds for a first set of component carriers associated with a first set of numerologies, wherein the first set of CDRX parameters defined in milliseconds comprises at least a first ON duration timer and a first inactivity timer; and
      communicate, via the at least one transceiver, with the base station in accordance with a second set of CDRX parameters defined in milliseconds for a second set of component carriers associated with a second set of numerologies, wherein the second set of CDRX parameters defined in milliseconds comprises at least a second ON duration timer and a second inactivity timer.

28. The UE of claim 27, wherein the first set of CDRX parameters comprises a first set of radio resource control (RRC) parameters, and wherein the second set of CDRX parameters comprises a second set of RRC parameters.

29. The UE of claim 28, wherein:
   the first set of RRC parameters further comprises a first long cycle start offset timer, a first short cycle length, a first short cycle timer, a first slot offset, or any combination thereof, and
   the second set of RRC parameters further comprises a second long cycle start offset timer, a second short cycle length, a second short cycle timer, a second slot offset, or any combination thereof.

30. The UE of claim 27, wherein CDRX parameters of the first set of CDRX parameters are configured independently from CDRX parameters of the second set of CDRX parameters.

31. The UE of claim 27, wherein a start time of a first CDRX cycle of the first set of CDRX parameters is aligned with a start time of a second CDRX cycle of the second set of CDRX parameters.

32. The UE of claim 27, wherein each of the first and second sets of component carriers enters an inactive state independently based on one or more inactivity timers associated with the first and second sets of CDRX parameters.

33. The UE of claim 27, wherein each of the first and second sets of component carriers enters an active state independently based on a separate grant for each of the first and second sets of component carriers.

34. The UE of claim 27, wherein the at least one transceiver does not transmit a sounding reference signal (SRS) on the first set of component carriers based on:
   a medium access control (MAC) entity of the UE not being in an active state until a threshold period of time prior to a symbol in which the SRS is scheduled to be transmitted.

35. The UE of claim 34, wherein the SRS is associated with the first set of component carriers.

36. The UE of claim 27, wherein the at least one processor does not report channel state information (CSI) on a physical uplink control channel (PUCCH) based on:
   CSI masking being configured and an ON duration timer not running until within a threshold period of time prior to a symbol in which the PUCCH is scheduled to be transmitted.

37. The UE of claim 36, wherein the PUCCH is associated with the first set of component carriers.

38. The UE of claim 27, wherein the at least one processor does not report CSI on a PUCCH based on:
   a MAC entity of the UE not being in an active state until a threshold period of time prior to a symbol in which the PUCCH is scheduled to be transmitted.

39. The UE of claim 27, wherein, regardless of being in an inactive state, a MAC entity of the UE transmits:
   hybrid automatic repeat request (HARM) feedback,
   aperiodic CSI on a physical uplink shared channel (PUSCH), and
   aperiodic SRS.

40. The UE of claim 27, wherein the at least one transceiver does not transmit SRS on the first set of component carriers based on:
   a MAC entity of the UE not being in an active state for both the first and second sets of component carriers, or
   the MAC entity not being in an active state for the first or the second set of component carriers in which a grant for a PUCCH was received.

41. The UE of claim 27, wherein the at least one processor does not report CSI on a PUCCH based on:
   CSI masking being configured and an ON duration timer not running for both the first and second sets of component carriers, or
   the ON duration timer not running for the first or the second set of component carriers in which a grant for the PUCCH was received.

42. The UE of claim 27, wherein the at least one processor does not report CSI on a PUCCH based on:
   a MAC entity of the UE not being in an active state for both the first and second sets of component carriers, or
   the MAC entity not being in an active state for the first or the second set of component carriers in which a grant for the PUCCH was received.

43. The UE of claim 27, wherein, regardless of being in an inactive state, a MAC entity of the UE transmits:
   HARQ feedback,
   aperiodic CSI on a PUSCH, and
   aperiodic SRS.

44. The UE of claim 27, wherein:
   a subset of CDRX parameters of the first set of CDRX parameters are independent of sub carrier spacing associated with the first set of numerologies,
   a subset of CDRX parameters of the second set of CDRX parameters are independent of subcarrier spacing associated with the second set of numerologies, and
   the subset of CDRX parameters of the first set of CDRX parameters are independent of the subset of CDRX parameters of the second set of CDRX parameters.

45. The UE of claim 44, wherein:
   the subset of CDRX parameters of the first set of CDRX parameters comprises the first ON duration timer, the first inactivity timer, a first long cycle start offset timer, a first short cycle length, a first short cycle timer, a first slot offset, or any combination thereof, and the subset of CDRX parameters of the second set of CDRX parameters comprises the second ON duration timer, the second inactivity timer, a second long cycle start offset timer, a second short cycle length, a second short cycle timer, a second slot offset, or any combination thereof.

46. The UE of claim 27, wherein the first and second sets of component carriers become active during a pending scheduling request or a pending random access response.

47. The UE of claim 27, wherein the at least one processor is further configured to:
receive, via the at least one transceiver, a MAC control element (MAC-CE) discontinuous reception (DRX) command, wherein the MAC-CE DRX command is common to both the first and second sets of component carriers, the first or the second set of component carriers in which the MAC-CE DRX command was received, or indicates that both of the first and second sets of component carriers are to enter an inactive state.

48. The UE of claim 27, wherein:
the first set of component carriers comprises one or more component carriers operating in a first frequency range, and
the second set of component carriers comprises one or more component carriers operating in a second frequency range.

49. The UE of claim 27, wherein:
the first set of component carriers comprises one or more component carriers operating in a first frequency band, and
the second set of component carriers comprises one or more component carriers operating in a second frequency band.

50. The UE of claim 27, wherein:
the first set of component carriers comprises one or more component carriers of a first group of cells, and
the second set of component carriers comprises one or more component carriers of a second group of cells.

51. The UE of claim 50, wherein the first group of cells, the second group of cells, or both operate in accordance with a single numerology.

52. The UE of claim 50, wherein the first group of cells, the second group of cells, or both operate in accordance with multiple numerologies.

53. A user equipment (UE) configured to operate in a carrier aggregation mode, comprising:
means for communicating with a base station in accordance with a first set of connected mode discontinuous reception (CDRX) parameters defined in milliseconds for a first set of component carriers associated with a first set of numerologies, wherein the first set of CDRX parameters defined in milliseconds comprises at least a first ON duration timer and a first inactivity timer; and
means for communicating with the base station in accordance with a second set of CDRX parameters defined in milliseconds for a second set of component carriers associated with a second set of numerologies, wherein the second set of CDRX parameters defined in milliseconds comprises at least a second ON duration timer and a second inactivity timer.

54. A non-transitory computer-readable medium storing computer-executable instructions for wireless communication that, when executed by at least a processor of a user equipment (UE) operating in a carrier aggregation mode, cause at least the processor of the UE to:
communicate with a base station in accordance with a first set of connected mode discontinuous reception (CDRX) parameters defined in milliseconds for a first set of component carriers associated with a first set of numerologies, wherein the first set of CDRX parameters defined in milliseconds comprises at least a first ON duration timer and a first inactivity timer; and
communicate with the base station in accordance with a second set of CDRX parameters defined in milliseconds for a second set of component carriers associated with a second set of numerologies, wherein the second set of CDRX parameters defined in milliseconds comprises at least a second ON duration timer and a second inactivity timer.

\* \* \* \* \*